US012413791B2

(12) United States Patent
Potetsianakis et al.

(10) Patent No.: US 12,413,791 B2
(45) Date of Patent: Sep. 9, 2025

(54) PRIORITIZED DECODING AND OUTPUT OF PARTS OF A PICTURE IN VIDEO CODING

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Emmanouil Potetsianakis, The Hague (NL); Emmanuel Thomas, Delft (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

(*) Notice: Subject to any disclaimer, the term of this patent is extended or adjusted under 35 U.S.C. 154(b) by 169 days.

(21) Appl. No.: 18/259,561

(22) PCT Filed: Dec. 16, 2021

(86) PCT No.: PCT/EP2021/086136
§ 371 (c)(1),
(2) Date: Jun. 27, 2023

(87) PCT Pub. No.: WO2022/144184
PCT Pub. Date: Jul. 7, 2022

(65) Prior Publication Data
US 2024/0056614 A1    Feb. 15, 2024

(30) Foreign Application Priority Data
Dec. 28, 2020   (EP) .................................... 20217377

(51) Int. Cl.
*H04N 19/96*    (2014.01)
*H04N 19/169*   (2014.01)
(Continued)

(52) U.S. Cl.
CPC ........... *H04N 19/96* (2014.11); *H04N 19/174* (2014.11); *H04N 19/176* (2014.11); *H04N 19/188* (2014.11)

(58) Field of Classification Search
CPC ....................................................... H04N 19/96
(Continued)

(56) References Cited

U.S. PATENT DOCUMENTS

| 10,003,815 B2 | 6/2018 | Ramasubramonian et al. |
| 11,228,775 B2 | 1/2022 | Xu et al. |

(Continued)

FOREIGN PATENT DOCUMENTS

| EP | 2884744 A1 | 6/2015 |
| EP | 3151566 A1 | 5/2017 |

(Continued)

OTHER PUBLICATIONS

PCT International Search Report and Written Opinion for International Application No. PCT/EP2021/086136 internationally filed on Dec. 16, 2021.

(Continued)

*Primary Examiner* — Amir Shahnami
(74) *Attorney, Agent, or Firm* — Hamilton, Brook, Smith & Reynolds, P.C.

(57) ABSTRACT

Methods and apparatus for processing an encoded representation of a sequence of pictures are disclosed, wherein the method includes: allocating memory for a current picture of the sequence of pictures in a decoded picture buffer, DPB; receiving a bitstream comprising an encoded representation of the current picture, and storing the encoded representation as a plurality of decoding units DUs, in a coded picture buffer, CPB, each of the plurality of DUs comprising an encoded set of pixels, wherein no coding dependency exists between coded pixels of different DUs of the current picture;

(Continued)

receiving prioritization information associated with each of the plurality of DUs stored in the CPB, the prioritization information defining a decoding order in which the DUs of the current picture are being decoded; decoding one or more of said plurality of DU's into one or more decoded DU's, in accordance with said decoding order, each decoded DU comprising a set of pixels, each set of pixels being associated with a different area in the current picture; storing the sets of pixels in the DPB, a set of pixels being stored at a location in the allocated memory of the DPB that corresponds to a position of the area in the current picture; and, outputting as a partial output, one or more sets of pixels of decoded DUs of the current picture in accordance with the decoding order, while other DUs of the current picture are being decoded or received by the decoding apparatus.

16 Claims, 15 Drawing Sheets

(51) Int. Cl.
*H04N 19/174* (2014.01)
*H04N 19/176* (2014.01)

(58) Field of Classification Search
USPC .................................................. 375/240.12
See application file for complete search history.

(56) References Cited

U.S. PATENT DOCUMENTS

| 11,695,965 | B1 | 7/2023 | Sánchez De La Fuente et al. |
| 2007/0171975 | A1 | 7/2007 | Smith et al. |
| 2008/0002773 | A1 | 1/2008 | Lai |
| 2008/0069247 | A1 | 3/2008 | He |
| 2008/0219347 | A1 | 9/2008 | Nakamura et al. |
| 2010/0034288 | A1 | 2/2010 | Chang et al. |
| 2010/0189181 | A1 | 7/2010 | Zheng et al. |
| 2010/0189182 | A1 | 7/2010 | Hannuksela |
| 2012/0106644 | A1* | 5/2012 | Henry ............... H04N 19/63 375/E7.243 |
| 2012/0201475 | A1 | 8/2012 | Carmel et al. |
| 2013/0266076 | A1 | 10/2013 | Wang et al. |
| 2013/0279600 | A1 | 10/2013 | Toma et al. |
| 2014/0072038 | A1 | 3/2014 | Samuelsson et al. |
| 2014/0092964 | A1 | 4/2014 | Ugur et al. |
| 2014/0169448 | A1 | 6/2014 | Wang |
| 2014/0192895 | A1 | 7/2014 | Chen et al. |
| 2015/0016545 | A1 | 1/2015 | Ramasubramonian et al. |
| 2017/0142421 | A1 | 5/2017 | Roh |
| 2018/0160122 | A1 | 6/2018 | Xu et al. |
| 2021/0385472 | A1 | 12/2021 | Seregin et al. |
| 2023/0049909 | A1 | 2/2023 | Thomas et al. |
| 2024/0056590 | A1 | 2/2024 | Potetsianakis et al. |

FOREIGN PATENT DOCUMENTS

| WO | 2021/136783 A1 | 7/2021 |
| WO | 2022/144244 A1 | 7/2022 |

OTHER PUBLICATIONS

Annex C of the HEVC specification published as ISO/IEC 23008-2 and Recommendation ITU-T H.265 (Nov. 2019).
Flynn, D. et al., "High Efficiency Video Coding (HEVC) Range Extensions text specification: Draft 2 (for PDAM)", Joint Collaborative Team on Video Coding (JCT-VC), 12th Meeting, Jan. 2013, 330 pages.
Sze et al. "High efficiency video coding (HEVC)." Integrated Circuit and Systems, Algorithms and Architectures. Springer 1-375 (2014).

* cited by examiner

PRIORITIZED DECODING AND OUTPUT OF PARTS OF A PICTURE IN VIDEO CODING

This application is the U.S. National Stage of International Application No. PCT/EP2021/086136, filed Dec. 16, 2021, which designates the U.S., published in English, and claims priority under 35 U.S.C. § 119 or 365 (c) to European Application No. 20217377.9, filed Dec. 28, 2020. The entire teachings of the above applications are incorporated herein by reference.

FIELD OF THE INVENTION

The invention relates to prioritized decoding of one or more parts of a picture in video coding, and, in particular, though not exclusively, to methods and systems for prioritized decoding and output of one or more parts of a picture, a video decoder apparatus, a video encoder apparatus and a bitstream generator apparatus using such methods and a computer program product for executing such methods.

BACKGROUND OF THE INVENTION

State of the art video coding standards such as AVC, AV1, HEVC, VVC, etc. rely on a hypothetical decoder model that specifies the relation between a buffering process of a bitstream comprising coded pictures, a decoder process for decoding the coded pictures and a buffering process of decoded coded pictures before outputting them. For example, the HEVC standard defines in Annex C of the HEVC specification published as ISO/IEC 23008-2 the so-called hypothetical reference decoder (HRD) model. The HRD allows an encoder to specify the constraints of a bitstream to identify the capabilities needed to ensure that the bitstream can be correctly buffered, decoded, and output.

A HRD typically defines a coded picture buffer (CPB), an instantaneous decoding process and a decoded picture buffer (DPB). At its input, the decoder receives a formatted bitstream comprising an encoded representation of sequences of pictures, which may comprise data structures, such as NAL units, carrying coded video data and associated metadata. A parser may extract the NAL units from the bitstream, unpacks the NAL units that comprise payload and associated metadata and use the metadata to store coded video data in the CPB. The metadata may include information related to the picture decoding order, i.e. the order in which the pictures are to be decoded, and information related to order in which the pictures are to be output or rendered such as the picture order count (POC), which is used to identify pictures in the CPB.

State of the art decoders are capable of storing coded video data as an access units (AU), i.e. a complete picture, or a subset of an AU, a decoding unit DU, e.g. an independent slice of a picture, representing a part of a picture. Thus, in the latter case, a plurality of DUs may define a full picture. The operation of the HRD includes an initialization wherein both the CPB and the DPB are being set to be empty and thereafter a hypothetical stream scheduler (HSS) delivers stores DUs into the CPB according to a specified arrival schedule. During decoding, DUs are removed and decoded instantaneously by the instantaneous decoding process at the CPB removal time of the DU. Thereafter, each decoded picture is placed in the DPB and output according to further timing information.

Current hypothetical decoder models, such as the HRD model of the HEVC standard, define output at the level of an access unit, i.e. a whole picture. Hence, in principle a picture is output from the DPB once all DUs forming the picture have been decoded. However, nowadays many applications required fast access to the decoded data in the CPB.

For example, some applications pack different video objects, e.g. different viewpoints of the same scene, cubemap faces of 360 video format, point cloud data and video data, etc. inside the same picture, while these different objects do not necessarily have to be displayed together nor at the same time and, in some cases, these objects are in the end not displayed at all when pruned by the rendering step. One advantage of such packing of different video objects into the same frames is that the different objects are time-locked (synchronised) by design of video elementary streams, i.e. by belonging to a single frame corresponding to a certain decoding timestamp, hence referring to a single point in time of the media timeline. But when these different video objects are packed together in the same picture, they become available to the application all at the same time as a single output picture after decoding. Thus, an application has no fine access to each of these objects but can only access when the whole picture including its objects are decoded.

When decoding omnidirectional content, such as a cubemap projected video, a picture contains different parts (faces) of a spherical video. During rendering, the relevance of each face may depend on the current user's viewport. Hence, for a certain time instance, one or more faces may contain the pixels of a user's viewport while the other faces are not viewed by the user. As a result, it may be advantageous for an application to retrieve or at least to have access to updated pixels in the user's viewport of the next frame as soon as possible to apply the rest of the rendering pipeline so that the presented pictures can be refreshed at high rate.

Hence, from the above it follows there is a need in the art for improved video coding methods and video coding systems that enables fast access to prioritized data in decoded pixel buffer of the decoder.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. Additionally, the Instructions may be executed by any type of processors, including but not limited to one or more digital signal processors (DSPs), general purpose microprocessors, application specific integrated circuits (ASICs), field programmable logic arrays (FP-GAs), or other equivalent integrated or discrete logic circuitry.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The embodiments in this disclosure aim to provide prioritized decoding of parts of a picture and output of the prioritized decoded parts, while other parts of the picture are still being decoded by the decoder or are still being received by the decoder.

This way, the embodiments described in this disclosure allow an application programming interface, API, outside the decoding apparatus application, e.g. VR application, an image post-processing application or an ultra-low latency application, to access a data sink comprising the decoded part of the current picture as stored in the decoded picture buffer, DPB, of the decoder apparatus. This access is possible before the current picture is entirely decoded. An application can access (a part of) the decoded picture in the data sink while other parts of the picture are not decoded yet (i.e. the DUs have not arrived in the CPB or have not been removed from the CPB). The application, e.g. a rendering process or a video processing step, may already start on the basis of a first part of the current picture, while a second part of the current picture is still being decoded.

In an aspect, the invention relates to a method of processing an encoded representation of a sequence of pictures, wherein the method may include: allocating, by a processor of a decoding apparatus, memory for a current picture of the sequence of pictures in a decoded picture buffer, DPB. The method may further include receiving, by the processor, a bitstream comprising an encoded representation of the current picture, and storing the encoded representation as a plurality of decoding units DUs, in a coded picture buffer, CPB, wherein each of the plurality of DUs may comprise an encoded set of pixels and wherein at least two DUs have no an intra-coding dependency on pixels of the other DUs of the plurality of DUs.

Further, the method may include receiving, by the processor, prioritization information associated with the plurality of DUs stored in the CPB, the prioritization information defining a decoding order in which the DUs of the current picture can be decoded, preferably taken into account the intra-coding dependencies of pixels of DUs of at least part of the plurality of DUs. The method may also include decoding, by the processor, one or more of said plurality of DU's into one or more decoded DU's, in accordance with said decoding order, each decoded DU comprising a set of pixels, each set of pixels being associated with a different area in the current picture. Further, the method may include storing, by the processor, the sets of pixels in the DPB, a set of pixels being stored at a location in the allocated memory of the DPB that corresponds to a position of the area in the current picture. The method may also include: outputting by the processor, as a partial output, one or more sets of pixels of decoded DUs of the current picture in accordance with the decoding order, while other DUs of the current picture are being decoded or received by the decoding apparatus.

Different areas of pixels in a picture may be encoded as one or more DUs, wherein pixels in at least two DUs have no an intra-coding dependency on pixels of the other DUs of the plurality of DUs. For example, in case of spherical video data represented by the cube-map format wherein pixels of each face of the cube-map projection may be encoded as one or more DUs. Further, a priority attribute may be assigned to each of the DUs based on certain characteristics of the content. Once decoded, sets of pixels representing an area in a picture, output picture areas, may be stored in the DPB according to their location in the picture.

If a high priority DU has been decoded into an output picture area and the set of pixels that define the output picture area has been copied into the DPB, the output picture area may be outputted, e.g. copied into a data sink by the decoder, before all DUs of the picture have been decoded. This way, partial reconstruction of a predetermined prioritized part of a full picture may be achieved before the entire picture is decoded. The order in which the partial reconstruction is executed may be either content-specific, wherein the prioritization information defining the decoding order of DUs is, for example, determined by a content creator, or user- or application specific, wherein the prioritization information defining the decoding order of DUs is, for example, determined by an application that uses the decoder apparatus.

The embodiments allow for example an application to get fast access to a prioritized part of the picture before that the picture is entirely decoded. It enables an application to prioritize a specific part of a picture and to instruct a decoder apparatus to decoded the prioritized part of the picture, while other parts of the picture are still in the process of being decoded or even in the process of being received by the decoding apparatus. This way, a rendering or a post-processing step of the prioritized part of a picture, at the output side of the decoding apparatus may be started, while the picture is not fully decoded.

In an embodiment, the processor outputting the one or more sets of pixels of the decoded DUs may further comprise: determining output information, the output information identifying for at least one of the one or more sets of pixels a position of an area in the current picture. In another embodiment, the processor outputting the one or more sets of pixels of the decoded DUs may further comprise providing access to the output information for an application outside the decoding apparatus, preferably via an application programming interface.

In an embodiment, the processor outputting the one or more sets of pixels of decoded DUs may further comprise copying each of the sets of pixels in at least one data sink, which is accessible by an application outside the decoding apparatus, preferably via an API.

In an embodiment, the prioritization information may comprise for each DU of the current picture a DU identifier, for example a decoding_unit_idx identifier, In an embodiment, the prioritization information may include priority parameters, the priority parameters being used by the decoder apparatus to determine the decoding order.

In an embodiment, the prioritization information may include DU position identifiers for identifying the position of a set of pixels associated with a DU associated with the current picture, In an embodiment, the DU identifier and the priority parameter associated with a DU may be formatted as a Network Abstraction Layer, NAL, unit or the like, more preferably the NAL unit comprising or being implemented as a Supplemental Enhancement Information, SEI, message such as a DU info SEI message.

In an embodiment, the prioritization information may comprise a DU priority list for the current picture, the DU priority list comprising DU identifiers, for example decoding_unit_idx identifiers, the order of identified DUs in the DU priority list being used by the decoder apparatus to determine the decoding order. In an embodiment, a position of a DU identifier in the DU priority list may identify a decoding priority of a DU relative to a decoding priority of other DUs of the current picture. In an embodiment, the DU priority list associated with the current picture may be formatted as a NAL unit or the like, preferably the NAL unit comprising or being implemented as a supplemental enhancement information, SEI, message such a such as a Picture Timing SEI message.

In an embodiment, the output information may further comprise at least one of: information indicating whether the encoded representation of the current picture is fully decoded or not; information indicative of the number DUs that are not yet decoded and/or the number of DUs that are decoded; or, information for determining the number of DUs that are not yet decoded and/or the number of DUs that are decoded; one or more areas in the current picture that are not yet decoded and/or one or more areas in the current picture that are decoded; an output order identifier, preferably a picture order count POC value, associated with the current picture, the output order identifier identifying the output position of the current picture in the sequence of pictures relative to the output position of the other pictures in the sequence.

In an embodiment, one or more DUs of the plurality of DUs may comprise an encoded representation of at least one of: 360 video data, omnidirectional video data, depth information of a scene, video data associated with a predetermined viewing angle or point cloud data.

In an embodiment, the decoding order may be arranged for outputting pixel sets of decoded DUs associated with a viewport of a video rendering device, preferably a Virtual Reality, VR, rendering device, the outputting being prior to outputting pixel sets not associated with the viewport, wherein the viewport encompasses only a part of the current picture.

In an embodiment, the data sink may include at least one buffer that at least matches the size of a decoded DU, the performing of the partial output including: copying pixels of the decoded DU in the DPB to the at least one buffer; or, wherein the data sink comprises at least n buffers, preferably n being equal to the number of the plurality of DUs, the size of each of the n buffers at least matching the size of a decoded DU, the performing of the partial output including: copying pixels of the decoded DU in at least one of the n buffers.

In an embodiment, the data sink may have at least one buffer that at least matches the size of at least one picture. In an embodiment, the performing of the partial output may include: copying pixels of a decoded DU into the buffer at a position according to the position of the pixels of the decoded DU in the current picture.

In an embodiment, a DU may be based on one or more macroblocks as defined in AVC, one or more coded tree units CTUs as defined in HEVC, one or more slices as defined in HEVC or VVC or one or more sub-pictures as defined in VVC.

In an embodiment, the decoding may be based on a coding standard. In an embodiment, the coding standard may be a block-based video coding standard. In an embodiment, the coding standard may be one of: AVC, HEVC, VP9, AV1, VVC, EVC coding standard or a coding standard based on of the AVC, HEVC, VP9, AV1, VVC, EVC coding standard.

In an aspect, the invention relates to a decoding apparatus for processing an encoded representation of a sequence of pictures, the decoding apparatus comprising: a computer readable storage medium having at least part of a program embodied therewith; and, a computer readable storage medium having computer readable program code embodied therewith, and a processor, preferably a microprocessor, coupled to the computer readable storage medium, wherein responsive to executing the computer readable program code, the processor is configured to perform executable operations, wherein the executable operations may comprise one or more of the following steps: allocating memory for a current picture of the sequence of pictures in a decoded picture buffer, DPB; receiving a bitstream comprising an encoded representation of the current picture, and storing the encoded representation as a plurality of decoding units DUs, in a coded picture buffer, CPB, each of the plurality of DUs comprising an encoded set of pixels, wherein at least two DUs have no an intra-coding dependency on pixels of the other DUs of the plurality of DUs; receiving prioritization information associated with each of the plurality of DUs stored in the CPB, the prioritization information defining a decoding order in which the DUs of the current picture are being decoded; decoding one or more of said plurality of DU's into one or more decoded DU's, in accordance with said decoding order, each decoded DU comprising a set of pixels, each set of pixels being associated with a different area in the current picture; storing the sets of pixels in the DPB, a set of pixels being stored at a location in the allocated memory of the DPB that corresponds to a position of the area in the current picture; and, outputting as a partial output, one or more sets of pixels of decoded DUs of the current picture in accordance with the decoding order, while other DUs of the current picture are being decoded or received by the decoding apparatus.

In an embodiment, the executable operations further comprise: copying each of the sets of pixels in at least one data sink, which is accessible by an application outside the decoding apparatus, preferably via an API; determining output information, the output information identifying for at least one of the one or more sets of pixels a position of an area in the current picture; and, providing access to the output information for an application outside the decoding apparatus, preferably via an application programming interface.

In an aspect, the invention may relate to a decoding apparatus configured to perform any of the steps described above.

In a further aspect, the invention may also relate to an encoder apparatus for determining an encoded representation of a sequence of pictures. In an embodiment, the encoder apparatus may comprise a computer readable storage medium having computer readable program code embodied therewith, and a processor, preferably a microprocessor, coupled to the computer readable storage medium, wherein responsive to executing the computer readable program code.

In an embodiment, the processor may be configured to perform any of the following executable operations: receiving a sequence of pictures comprising pixels; identifying coding dependencies between pixel regions of a current picture in the sequence of pictures and pixels regions of other pictures in the sequence of pictures; encoding the current picture into a plurality of decoding units, DUs, each of the plurality of DUs comprising an encoded set of pixels; transforming the plurality of DUs in a bitstream comprising metadata for decoding the DUs, the metadata including prioritization information associated with the plurality of DUs stored in the CPB, the prioritization information defining a decoding order in which the DUs of the current picture can be decoded, preferably taken into account the intra-coding dependencies of pixels of DUs of at least part of the plurality of DUs, and storing said bitstream containing the DUs and the metadata in an output buffer.

In yet a further aspect, the invention may relate to a bitstream generating apparatus which is configured to: receiving a bitstream comprising an encoded representation of a sequence of pictures; parsing the bitstream and identifying for each encoded representation of a picture in the sequence, a plurality of DUs representing a current picture, each of the plurality of DUs comprising an encoded set of pixels; injecting metadata in the bitstream to form a modified bitstream, the metadata including prioritization information associated with the plurality of DUs stored in the CPB, the prioritization information defining a decoding order in which the DUs of the current picture can be decoded, preferably taken into account the intra-coding dependencies of pixels of DUs of at least part of the plurality of DUs; and, outputting the modified bitstream.

The granularity at which decoded information in the data sink becomes available by the partial picture output scheme may depend on the type of application. Here, the smallest unit that can be made available by a partial output is referred to as a decoding unit DU, i.e. a basic processing unit at which a decoder process takes place, e.g., output of one or more macro-blocks in AVC or one or more coding tree units (CTUs) in HEVC or VVC. Alternatively, sub-picture output of the DPB can be realized at higher level picture partitioning schemes, such a decoding unit (DU) or a sub-picture as defined in HEVC and VVC respectively. Coded DUs may represent a block of coded samples that is part of a coded picture. A decoded DU may define an area of samples of a predetermined shape, e.g. a rectangular area of samples, a triangular area of samples, etc.

The invention may also relate to a computer program product comprising software code portions configured for, when run in the memory of a computer, executing the method steps according to any of process steps described above. In this application the following abbreviations and terms are used:

The invention will be further illustrated with reference to the attached drawings, which schematically will show embodiments according to the invention. It will be understood that the invention is not in any way restricted to these specific embodiments.

DETAILED DESCRIPTION

Figure 1A:
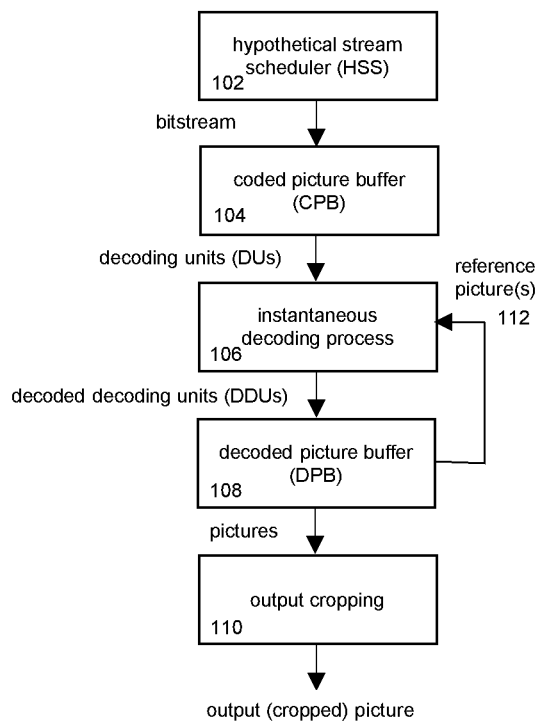
FIGS. 1A and 1B is a block diagram illustrating a known hypothetical reference decoder (HRD) model.
Figure 1B:
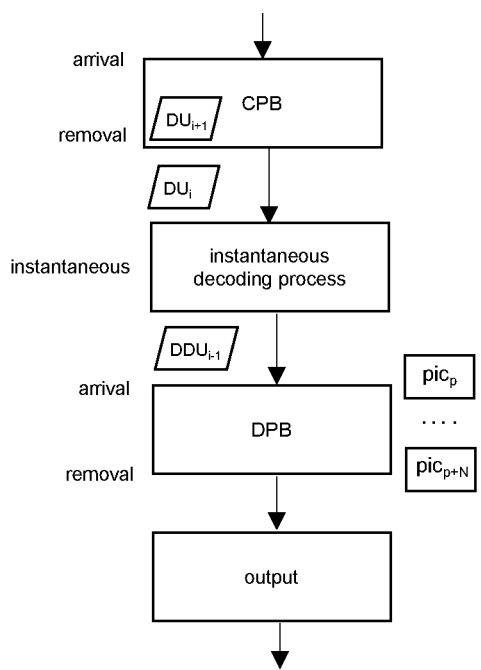

FIGS. 1A and 1B are block diagrams illustrating a buffer model for a hypothetical reference decoder (HRD) as defined in the HEVC video standard (Annex C of the HEVC specification published as ISO/IEC 23008-2 and Recommendation ITU-T H.265). Most codecs use a standardized decoder model for specifying constrains regarding the buffers that are used during encoding and decoding. As shown in FIG. 1A, a bitstream comprising a coded representation of pictures fed to the input into a coded picture buffer CPB 104 according to a specified arrival schedule are delivered by the hypothetical stream scheduler (HSS) 102. The coded pictures and associated metadata are extracted from the bitstream and stored in a coded picture buffer CPB. The CPB is a first-in first-out buffer for storing the coded pictures before being provided to the decoding process 106. In some cases, each coded picture may comprise a plurality of decoding units (DUs). In that case the coded pictures may be delivered in a bitstream to the CPB and stored as DUs in the CPB. Then, the coded pictures are decoded by providing each of the plurality of DUs in a predetermined order to the decoding process 104. Once provided to the decoding process, a DU is removed from the CPB. As the decoding process is considered instantaneously, the DU is decoded at the CPB removal time of the DU.

Decoded DUs produced by the decoding process 104 are stored in the decoded picture buffer DPB 106. The DPB is a buffer holding (samples of) decoded pictures for reference (e.g., inter-prediction) and for delaying output. A decoded picture may be removed from DPB when it is no longer needed for inter-prediction and no longer needed for output. In some examples, decoded pictures in the DPB 106 may be cropped by an output cropping unit 108 before being outputted and displayed. Output cropping unit 108 may be part of the video decoder or may be part of external processor, e.g. a rendering engine, configured to further process the output of the video decoder. The behavior of the CPB and DPB is mathematically specified by the hypothetical reference decoder model, which imposes constraints on different timing, buffer sizes and bit rates. Typical HRD parameters may include parameters such as: initial CPB removal delay, CPB size, bit rate, initial DPB output delay, and DPB size.

FIG. 1B depicts a timing model of the HRD, which defines the decoding of a sequence of pictures, for example a coded video sequence (CVS) or a group of pictures (GOP), that form a self-contained set of video data which can be decoded without any further information. The decoding of the pictures is defined as a succession of steps starting at t=0 and ending when the last picture of the sequence is decoded and output. The HRD is defined for decoding both access units (AUs), wherein each AU represents coded samples of a full picture and decoding units (DUs), wherein each DU represents coded samples of part of a picture (in VVC referred to as a sub-picture). This model considers several events, wherein each event is associated with a point in time during the decoding process:

the initial (first bits) and final (last bits) arrival of the (i+1)-th DU in the CPB, $t_{init\ arr}^{CPB}(DU_{i+1})$ and $t_{final\ arr}^{CPB}(DU_{i+1})$;

the removal of the i-th DU from the CPB, $t_{rem}^{CPB}(DU_i)$;

the arrival of the decoded (i−1)-th DU (DDU) in the DPB, $t_{arr}^{DPB}(DDU_{i-1}) = t_{rem}^{CPB}(DU_i)$;

the output of a picture, $t_{out}^{DPB}(Pic_p)$.

Here the removal of a coded DU from the CPB and the arrival of a decoded DU at the DPB are the same as in coding standards such as HEVC and VVC, the decoding process of a DU is assumed to be instantaneous.

Figure 2A:
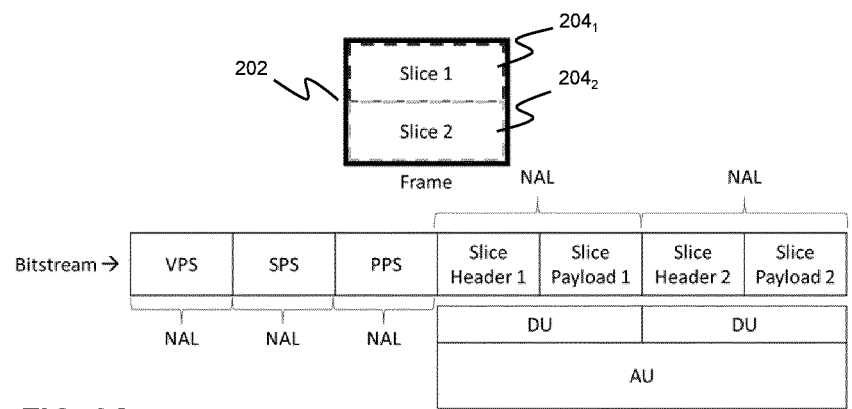
FIG. 2A-2C illustrate the concept of decoding units and picture sequence structures.

The input of the CPB is a bitstream comprising DUs wherein a DU can either be an AU or a subset of an AU. The CPB removal is based on an access unit (AU), i.e. a full coded picture, which may be formatted as a set of network abstract layer (NAL) units comprising data of one coded picture. An example of a subset of an AU may be for example a slice of an AU, as shown in FIG. 2A. This figure illustrates for example a bitstream including a set of NAL units including non-VCL NAL units (VSP, SPS and PPS) and two VCL NAL units forming an AU. This example thus illustrates a bitstream comprising a coded representation of a video frame 202 that is divided into two slices $204_{1,2}$, each occupying half of the frame and dividing it horizontally. When the decoder receives the bitstream it may parse the bitstream and extract the VCL NAL units and store each of the VCL NAL units as a DU. Such DU may be for example a slice of a picture.

DUs defined as subset of AUs were introduced in standards, such as the HEVC standard, for low-delay applications where the decoding of a frame can be for instance broken down into decoding rows of blocks. Timing information may be assigned to a DU using a SEI message. For example, a picture timing SEI message may be used to indicate the timing for coded picture buffer (CPB) removal and decoded picture buffer (DPB) removal of a whole access unit. Thus, the concept of DUs in the HRD model was introduced to enable the start of the decoding of a picture (a video frame) while not all DUs of the picture have arrived in the CPB. This way, delays that occur at the input side of decoder apparatus, due to for example encoding and transmission can be reduced. The output of the CPB however is managed by the HRD at picture-level, so the concept of decoded DUs in the DPB does not have any functional purpose.

In this application, the concept of DUs as described with reference to FIGS. 1 and 2 is extended and used in a modified HRD model to enable a low-delay output of decoded sets of pixels of prioritized areas of a picture. Here, the output of the decoded sets of pixels of a coded picture (i.e., the output of part of the picture) is enabled before the whole picture is decoded. In this application, the term DU may refer to a basic decoding unit defined in any known or future video coding standard, For example, a DU may represents coded pixels of part of a picture (a sub-picture), including some metadata (as e.g. shown in FIG. 2A).

Examples of a DU may include one or more macroblocks known from AVC, one or more coding tree units (CTUs) known from HEVC and VVC or a sub-picture known from VVC. A DU forms a coded presentation of a set of pixels forming an area in a picture, wherein the coded pixels of one DU will not have any spatial coding dependency on coded pixels of other DUs of the same picture. The set of pixels that forms an area in the picture may be referred to in this application as an output picture area.

The size of the DPB is dependent on the coding hierarchy as it is configured to hold reference pictures that will be used to decode a current and/or one or more future pictures in a picture sequence structure. For example, it can happen that depending on the structure of the decoded pictures, pictures are decoded first but only presented later. This is the case for out-of-order encoding, wherein the encoded pictures in the bitstream are arranged in decoding order. Because of the coding dependencies, the DPB may hold certain decoded pictures for a short period until all pictures that are needed for decoding a picture are decoded. Thereafter, the decoded pictures may be output and be removed from the DPB if they are no longer needed for decoding.

Figures 2B, 2C:
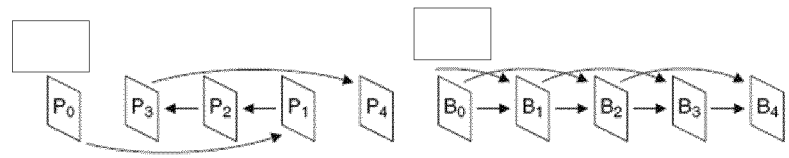

This is illustrated in FIGS. 2B and 2C which show two sequences of encoded pictures P1-P4 and B1-B4 arranged in output order, wherein the numbers indicate the decoding order. Because of the decoding dependencies, decoding these sequences requires in these examples a DBP size of (at least) three pictures. For example, decoded pictures P1 and P2 in FIG. 2A both need to be stored in the DPB when P3 is being decoded since they are both output after P3. The DPB therefore needs to be capable to store P1, P2, and P3 simultaneously. Similarly, in FIG. 2B each picture uses two reference pictures so the DPB needs to be large enough to store three pictures simultaneously. For example, decoding B2 requires decoded pictures B0 and B1. The referencing structure in FIG. 2B is an example of a so-called low-delay structure based on B-pictures, in which bi-prediction is extensively used. In this structure the coding order and the output order are identical.

In the HEVC HRD model, removal of coded video data from the CPB can be managed at AU-level (entire picture) or DU-level (sub-picture), wherein the decoding of an AU or DU is assumed to be instantaneous. An AU defines a data structure in the form of a set of network abstract layer (NAL) units, comprising one coded picture. A decoder may follow signaled decoding times (e.g., as defined in so-called picture timing supplemental enhancement information (SEI) messages) that are generated by the video encoder to start decoding of AUs. The HRD model defines syntax elements that can be used to control the timing of the decoding and the output.

The CPB may operate at either the AU level (i.e., picture level) or DU level (sub-picture level i.e., less than an entire picture). The AU or DU level operation may depend on whether sub-picture level CPB operation is preferred by a decoder (which may be specified by an external means not specified in the HEVC standard) and whether sub-picture CPB parameters are present in the bitstream (or provided to a decoder via an external means not specified in the HEVC standard). When both conditions are true, the CPB may operate at a sub-picture level so that each DU is defined as a subset of an AU. Parameters and/or flags in the bitstream may signal the decoder in which mode it should operate. For example, a DU may be equal to an AU if a syntax element SubPicCpbFlag is equal to 0, the DU is a subset of an AU otherwise.

The encoder or an application may insert HRD parameters in the bitstream to control the decoding process on the basis of the HRD model. For example, in practical video applications, a decoder apparatus may follow signalled decoding times (e.g., as defined in so-called picture timing supplemental enhancement information (SEI) messages) that are generated by the video encoder to start decoding of AUs. In that case, the earliest possible time to output a particular decoded picture is equal to the decoding time of that particular picture, i.e. the time when a picture starts to be decoded, plus the time needed for decoding that particular picture (which in the HRD model is assumed to be instantaneous).

Video applications that make use of a video codec not only include streaming and broadcast/multicast applications, but also virtual reality (VR) and gaming applications. The latter being examples of video applications that consume so-called omnidirectional content. When encoding omnidirectional content, special projections such as a cube-map projection, are used to map pixels on a sphere on the 2D plane of a video picture. Such projected video frames comprise different parts of a spherical video wherein the content that is rendered is determined by the current user's viewport. Other examples of omnidirectional content may include for example point cloud data, wherein each point of the point cloud represents a vector in a coordinate system defining a 3D space. At each time instance, some parts of the omnidirectional video are covered by the user's viewport while other parts are not. As a result, it is advantageous for an application to retrieve updated samples in the user's viewport from the next frame as soon as possible to be able to refresh the presented pictures. Hence, for these applications a low-delay rendering pipeline is desired in which fast access to coded samples in the CPB and decoded samples in the DPB is desired.

Figure 3A:
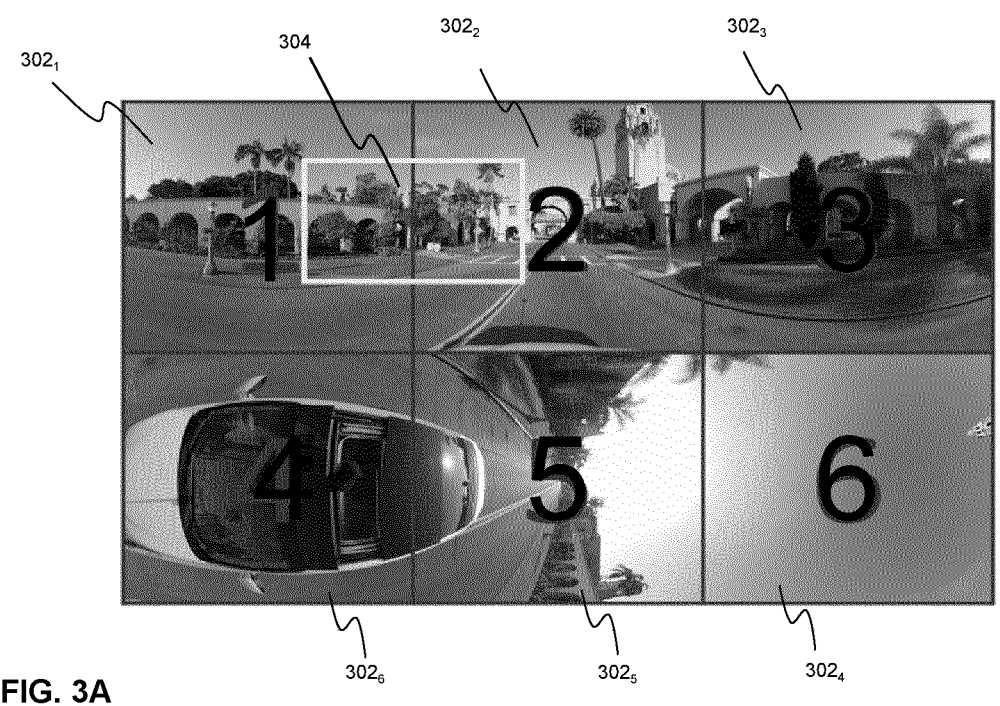
FIGS. 3A and 3B illustrate pictures comprising DUs.

In conventional VR video processing schemes such as tiled video streaming, the pixels of pictures of the VR video are spatially divided in tiles. For example, FIG. 3 illustrates a picture 302 having a well-known cube map format for 360-video, including areas of pixels representing different cube faces $304_{1-6}$ wherein each cube fact comprises projected content of a sphere of pixels. The pixels in each of the different cube faces may be self-decodable. In other words, the pixels may be encoded so that there is no encoding dependency between coded pixels of different cube faces.

The set of pixels defining such an area in a picture may be referred to as a tile. Based on the position of the viewport 306, the video streaming client may select certain tiles in a picture, in this example tiles 1 and 2, which are then encoded and transmitted in a stream (a so-called tile stream) to a video streaming client wherein a decoder will decode the tiles and, if necessary, stich tiles together to construct a set of pixels representing an area in the picture that coincides with the viewport of a user. In such video processing scheme, the processing of the video data is limited to the selected tiles. In many use cases however, it is still be beneficial to decode at least part of the other tiles as well. For example, the user may move his head requiring fast access to pixels of other tiles in a picture. Additionally, there may be decoding dependencies between the tiles in the current picture and their corresponding co-located tiles in subsequent pictures. Not decoding some of these tiles may break the CVS or GOP structure so that video decoding would no possible in that case.

The embodiments in this application address the above-mentioned problems. The main insights of the invention relate to a modified hypothetical reference decoder model, which enables prioritized DU-level processing of coded pictures and fast access to prioritized decoded DUs in the DPB. The modified HDR model allows DUs defining a set of coded pixels of an area in a picture to be ordered based on prioritization information so that DUs stored in the DPB that have a high priority can be provided to the decoding process before DUs of a lower priority. To achieve re-ordering of the decoding of DUs of a picture, at least part of the DUs is independently decodable, i.e. coded pixels of one DU of a picture do not have a coding dependency with coded pixels of other DUs of the same picture.

Figure 3B:
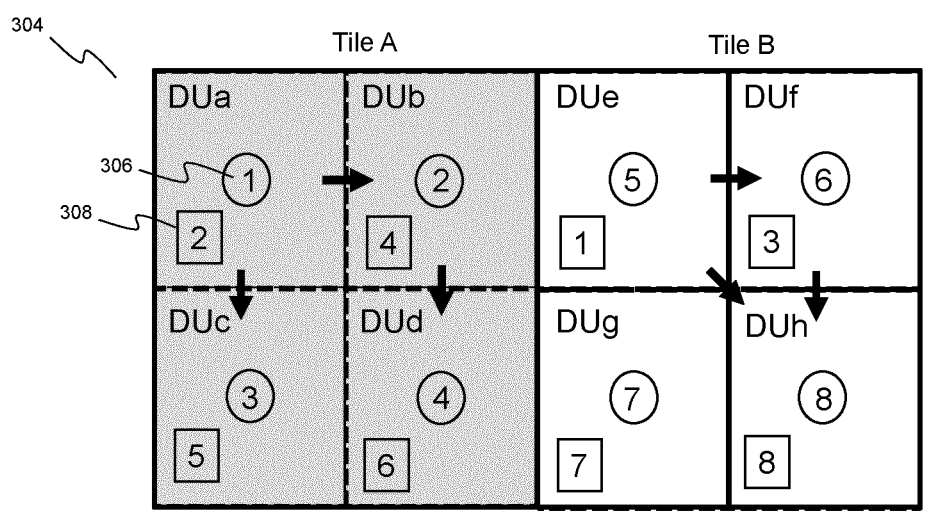

An example of a picture comprising DUs that are ordered based on prioritization information is provided in FIG. 3B. This figure illustrates a picture 304 (a video frame) including a plurality of tiles, in this example two tiles tile A and tile B, wherein each tile is divided in DUs, tiles A includes DUa-Dud and tile B includes DUe-Duh. The arrows between DUs depict coding dependencies between pixels of different DUs. For example, as shown in the figure, DUb and Duc have coding dependencies on DUa, wherein DUa has no (intra-frame) coding dependencies on other DUs and thus can be decoded independently from the other DUs in the picture. The DUs in the picture may be associated with a predetermined first decoding order as indicated by the circled numbers 306, which may define first decoding sequence numbers). This coding order starts with the DUa at the left corner of the first tile to DUd at the lower right corner of the first tile and then continuing with DUe at the left corner of the second tile to DUh.

A second coding order as denoted by the squared numbers 408 is also possible. These numbers may define second decoding sequence numbers. This decoding order starts with DUe of the second tile and DUa of the first tile. These DUs can be decoded without any pixels from other DUs. Thereafter, —taking into account the various coding dependencies—the DUs can be decoded in the order as indicated by the squared numbers.

Thus based on prioritization information (as e.g. denoted by the circled or squared decoding sequence numbers, wherein a low value decoding sequence number has a higher priority than a higher decoding sequence number) it is possible to prioritize either the sequence in which tiles are decoded (e.g. tile A and then tile B) or the upper half of the picture, followed by the lower half of the picture.

As shown in this picture, in both examples the dependencies are respected, while the decoding order of the DUs in the picture are changed. Note that many different alternatives are possible, for example, in a further example, first the DUs with no intra-frame dependencies are decoded (e.g. DUa,DUe,DUg) and then the DUs that have a coding dependency. In the most extreme case, each DU in the picture has no intra-frame coding dependency with pixels of other DUs. In that case, prioritization information can be used to determine any possible decoding sequence for the DUs in the picture.

The modified HRD model further takes into account that the coding process of DUs is not instantaneously but requires a number of clock cycles which can cause delay in making a decoded picture available for output to an application. To address this problem, the modified HRD model provides access to decoded DUs in the DPB, before the whole picture is decoded. Such fast access is particular advantageous in use cases wherein fast access to a particular part of a picture by an application (such as the viewport in VR applications) is required while the other part of the picture is still being received or decoded.

Figure 4A:
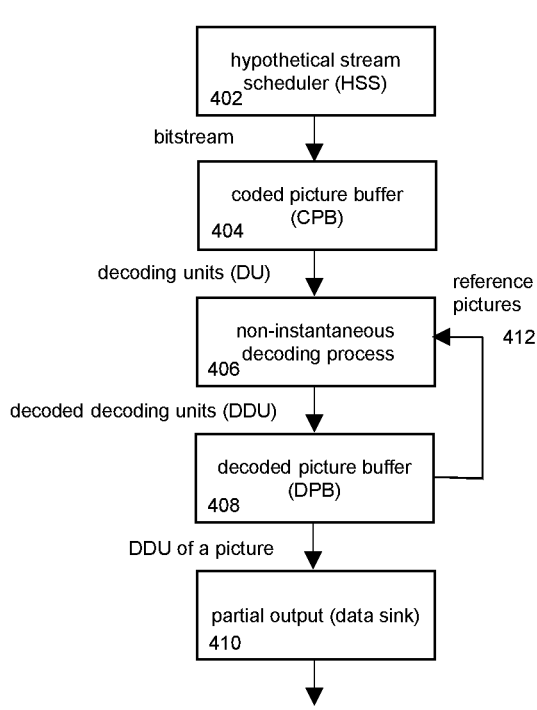
FIG. 4A-4C illustrate a modified hypothetical reference decoder (HRD) model according to an embodiment of the invention.
Figure 4B:
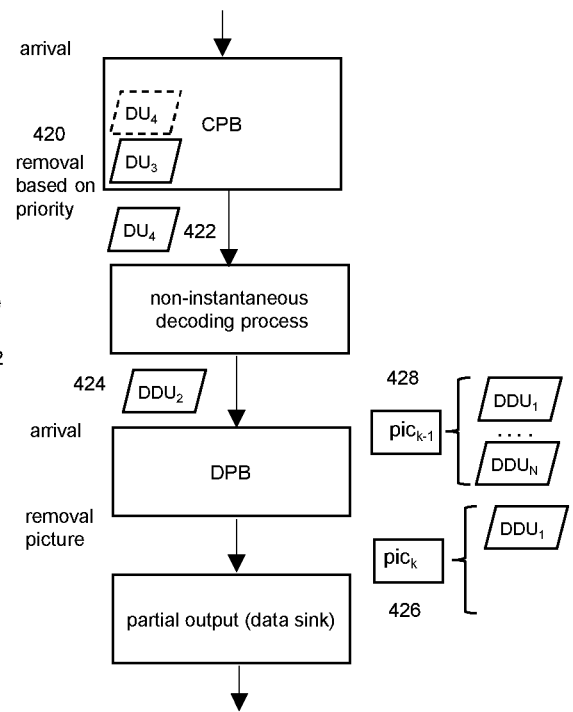

FIGS. 4A and 4B are block diagrams illustrating a buffer model for a hypothetical reference decoder according to an embodiment of the invention. As shown in FIG. 4A, a bitstream comprising coded pictures is input into a coded picture buffer CPB 402 according to a specified arrival schedule. This process is managed by the hypothetical stream scheduler (HSS). The coded pictures and associated metadata are stored as decoding units (DUs) in the CPB. The CPB is a buffer containing DUs of pictures which need to be decoded. Similar to the HRD model of FIG. 1, video data may be delivered as a bitstream to the input of the CPB and parsed by the decoder apparatus. This way, NAL units comprising video data and metadata of a picture may be stored as DUs in the CPB. The set of coded pixels of a DU form an encoded representation of an area of pixels in a picture. This area of pixels is referred to in this application as an output picture area.

Further, each DU of a plurality of DUs that form a picture is associated with metadata that allow prioritization of processing DUs of a picture. For example, each DU of a picture may be associated with a prioritization parameter, which allows the decoder to determine which DU of available DUs of a picture that are stored in the CPB should be provided to the decoding process first. This way, DUs are removed from the CPB based on the decoding priority information, decoded by decoding process 404 (e.g., by a video decoder) at the CPB removal time of the DU and stored in an allocated area of the DPB 406.

Due to the decoding prioritization of the DUs, the allocated area in the DPB will no longer be filled with pixels of decoded DUs according to the order as determined during encoding, e.g. a raster scan order or the like. Instead, a set of pixels of a decoded DU (DDU), an output picture area, will be placed in the DPB at a location that matches the location of the output picture area in the picture. This way, an allocated memory part in the DPB will be filled with sets of pixels of decoded DUs. This process may continue as long as DUs of the picture are available in the CPB and the time for picture in the CPB has not passed. During the decoding of the DUs, if a set of pixels of a decoded DU is copied to the DPB, the set of pixels may be outputted, e.g. copied to a data sink. This way, an application may have access to pixels of a predetermined part of the picture, while other parts (associated with other DUs are still being received or decoded). This process may be repeated every time a set of pixels of a decoded DU is copied to the DPB. Hence, during the reception and decoding of the DUs of the picture.

The timing scheme of the modified HDR model is schematically depicted in FIG. 4B. As shown in this figure, the CPB may be filled with DUs, wherein each DU has a certain associated priority. Based on the priority, DUs are removed 420 from the CPB and provided to the decoding process. For example, as shown in the figure, initially both $DU_3$ and $DU_4$ of a picture k were stored in the CPB and although $DU_4$ was received later, it is sent for decoding 422 earlier than $DU_3$ because it has a higher priority than $DU_{i+1}$. DUs of picture k that have been decoded, such as decoded $DU_2$ 424 and $DU_1$, will be stored in the DPB at a location 426 that is allocated to DUs of picture k and outputted, for example copied to a data sink, while the other DUs of picture k are still being processed. The DPB may also contain decoded DUs of other pictures, e.g. picture k−1, which may be used as a reference picture for decoding further pictures, e.g. picture k or other pictures will be sent via the bitstream to the decoder.

Figure 4C:
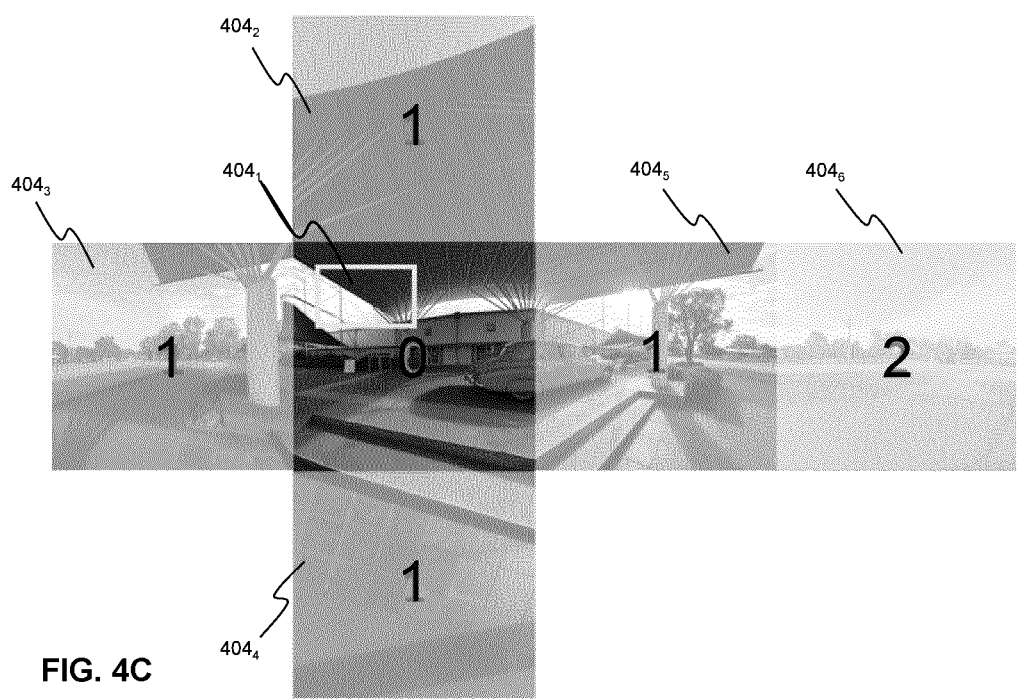

The scheme depicted in FIGS. 4A and 4B may be advantageously used for decoding video data for media applications such as VR or 360-video applications. Different areas of pixels in a picture may be encoded as one or more DUs, wherein pixels in one DU do not have encoding dependencies to other pixels in other DUs of the picture. For example, in case of spherical video data represented by the cube-map format as depicted in FIG. 3, pixels of each face of the cube-map projection may be encoded as one or more DUs, Further, a priority attribute may be assigned to each of the DUs based on certain characteristics of the content. An example of faces of a cube-map projection that have an assigned priority attribute is depicted in FIG. 4C. As shown in this picture, the highest priority (zero) may be assigned to one or more DUs of a (cube) face that comprises content of part of a 360 scene that is within the viewport $404_1$ of a user. Further, one or more DUs forming faces $404_{2-5}$ that neighbour the face comprising pixels belonging to the viewport may have priority of one, i.e. a priority lower than the one or more DUs associated with the viewport but higher than the DUs of faces $404_6$ that do not directly neighbour the face associated with the viewport (which has a priority 2). Pictures comprising VR data may be encoded into a bitstream in such a way that areas of pixels forming a face can by processed as DUs of the modified HDR model so that prioritized processing of DUs and fast output of decoded DUs, e.g. output picture parts, by the decoder apparatus can be achieved.

Obviously, the scheme is not only limited to the coding of pictures comprising cubic-projected pixels such as described with reference to FIG. 4C, but can be generally used for any type of picture format, wherein it is advantageous to associate different areas in a picture with different decoding priorities.

Once decoded, output picture areas, i.e. sets of pixels representing an area in a picture, may be stored in the DPB according to their location in the picture. If a high priority DU has been decoded into an output picture area and the set of pixels that define the output picture area has been copied into the DPB, the output picture area may be outputted, e.g. copied into a data sink by the decoder, before all DUs of the picture have been decoded. This way, partial reconstruction of a predetermined prioritized part of a full picture may be achieved before the entire picture is decoded. The order in which the partial reconstruction is executed may be either content-specific, wherein the prioritization information defining the decoding order of DUs is, for example, determined by a content creator, or user- or application specific, wherein the prioritization information defining the decoding order of DUs is, for example, determined by an application that uses the decoder apparatus.

The embodiments allow for example an application to get fast access to a prioritized part of the picture before that the picture is entirely decoded. It enables an application to prioritize a specific part of a picture and to instruct a decoder apparatus to decoded the prioritized part of the picture, while other parts of the picture are still in the process of being decoded or even in the process of being received by the decoding apparatus. This way, a rendering or a post-processing step of the prioritized part of a picture, at the output side of the decoding apparatus may be started, while the picture is not fully decoded.

Figure 5:
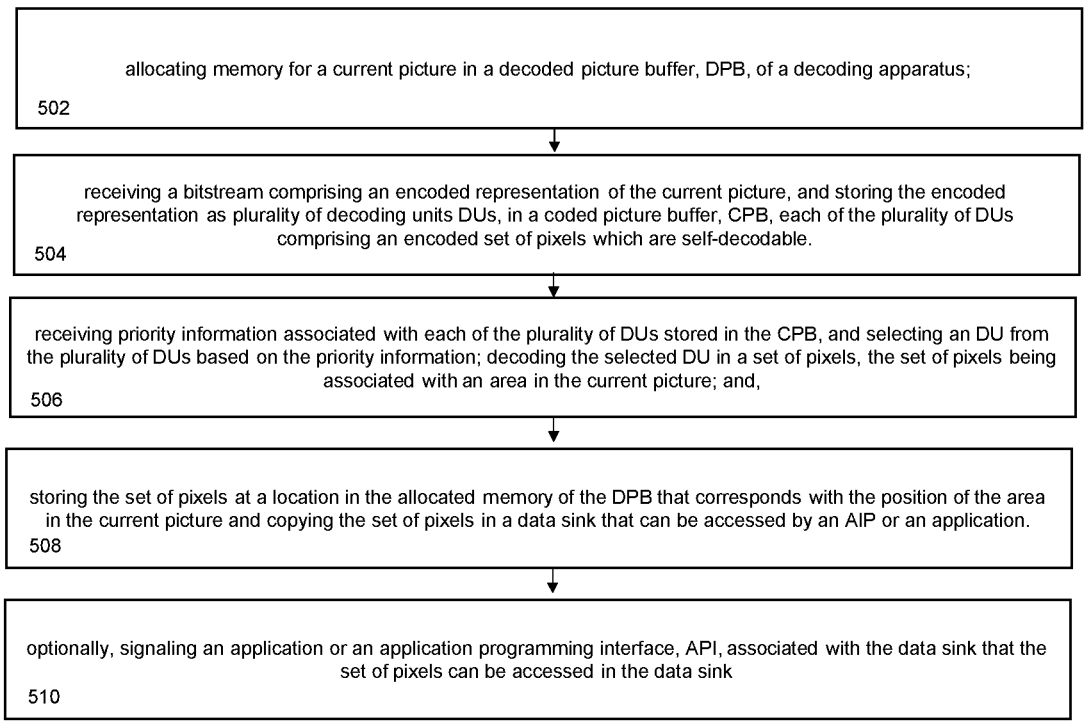
FIG. 5 depicts a flow diagram of a prioritized decoding process according to an embodiment of the invention.

An example of such prioritized decoding process executed by a decoder apparatus is described with reference FIG. 5. The prioritized decoding process may be executed by a decoder apparatus receiving a bitstream comprising an encoded representation of a sequence of pictures, including a current picture, i.e. a picture that needs to be decoded. In a first step 502, the decoder may allocate memory space for a current picture in a decoded picture buffer, DPB. The decoder apparatus may parse the bitstream and store the encoded representation of the current picture as plurality of decoding units DUs, in the coded picture buffer, CPB (step 504).

In an embodiment, the bitstream may comprising NAL units. The decoder apparatus may subsequently extract the NAL units from the bitstream, unpacks the NAL units that comprise payload, e.g. video data such as coded pixels, and associated metadata and uses the metadata to store the payload as DUs in the CPB. Here, a set of DUs may represent a coded picture that needs to be decoded into the decoded picture. Further, each of the DUs may represent a coded block of samples representing a part of the picture. Further, each of the plurality of DUs of the picture may comprise an encoded set of pixels, wherein at least two DUs of the plurality of DUs do not have an intra-coding dependencies on pixels of the other DUs. DUs of a picture may be arranged in a predetermined order in the bitstream, for example as described with reference to FIGS. 3A and 3B.

Conventionally DUs of a picture may be stored in the CPB and provided to the decoding process in raster-scan order. If however the decoder detects that DUs are associated with prioritization information, e.g. decoding sequence numbers as described with reference to FIGS. 3A and 3B, DUs may be provided to the decoding process in a sequence as dictated by the prioritization information, wherein the prioritization information takes into account that at least part of the DUs may have an (intra-frame) coding dependency on other DUs in the picture. This way the DUs may be processed (decoded) based on priority information. The decoder apparatus may further receive such priority information for each of a plurality of DUs that are stored in the CPB (step 506). The priority information may be implemented in different ways. In one variant the priority information may have the form of a priority parameter for each DU as shown in FIG. 4C. This parameter may be used for controlling the order in which DUs in the CPB are decoded.

For example, if the CPB contains DUs associated with faces $404_1$, $404_3$ and $404_4$, the decoder apparatus may select and provide the DU with the highest priority parameter (in this case a zero value) to the decoding process, irrespective at what moment and in which order this DU was loaded in the CPB. Hence, in that case, the DU associated with viewport $404_1$, i.e. the DU that coincides with the viewport of the user, may be provided to the decoding process. Thereafter, the decoder apparatus may select one of the DUs associated with priority parameter one.

Thus, based on the priority information, the decoder apparatus may select an DU from the plurality of DUs in the CPU and provide the selected DU to the decoding process so that it will be decoded in a set of pixels defining an area in the current picture (step 508). Different DUs are associated with different areas in the picture. Thus, the set of pixels corresponding to the DU that is decoded, will be stored at a location in the allocated memory of the DPB that corresponds with the position of the area in the current picture (step 510).

The decoder apparatus may further determine if, during decoding of the coded picture, a partial output can be performed, i.e. output of pixels of an output picture area. Such partial output operation may include copying the set of pixels of the decoded DU (forming the output picture area) from the DPB to a data sink (step 512), while other DUs of the coded picture are not yet decoded and removed from the CPB and/or arrived in the CPB. The decoder may perform the at least one partial output operation if the processor determines that the at least one partial output can be performed. The performing of the partial output may include marking the one or more decoded DUs stored in the DPB as being ready for partial output. The marking may signal the decoder not to remove the one or more decoded DUs from the DPB. Once the set of pixels is copied to the data sink, this set of pixels can be accessed by an application programming interface, AIP, or an application. Thereafter, in some embodiments, the application or, API may be signaled that the set of pixels are copied to the data sink.

The main insight of the embodiments in this disclosure is that if each coded picture of a coded video contains multiple DUs, a decoder may be configured to output a partial reconstruction of a predetermined part of the full picture (a partial output of the decoded picture) before the entire picture is decoded, i.e. before all DUs of the picture are removed from the CPB. The embodiments described in this disclosure allow a video application, e.g. VR application or an image post-processing application, to access a data sink comprising a predetermined part or predetermined parts of a picture (output picture areas) stored in the DPB, before the coded picture is entirely decoded. The invention thus enables an application fast access to a part of the decoded picture that has been prioritized, while another part of the picture is not yet decoded and e.g. still in sorted in the CPB or arriving in the CPB (DUs that are still arriving in the CPB or DUs that have not been removed from the CPB). This way, the application, e.g. a rendering process or a video processing step, may already start based on a decoded part of the picture, while the full picture is not yet fully decoded.

Figure 6:
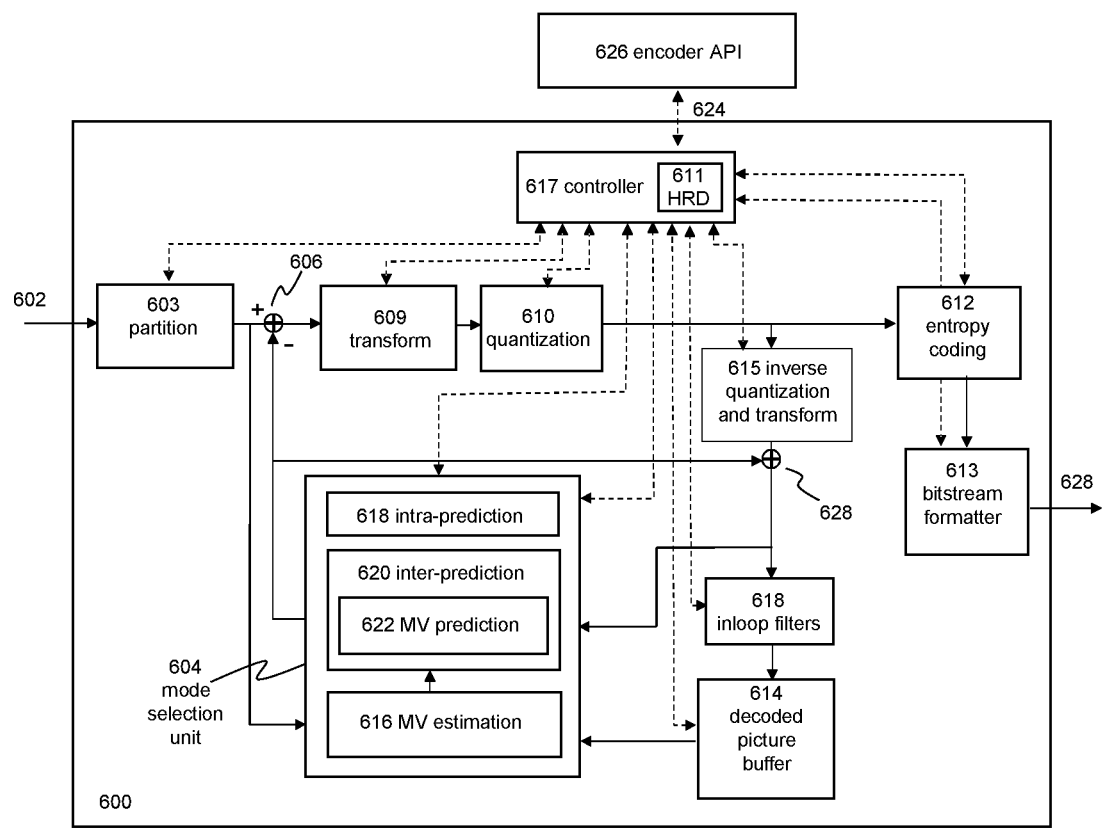
FIG. 6 depicts an encoder apparatus for generating a bitstream that is suitable for partial output.

FIG. 6 is a block diagram illustrating a video encoder apparatus 600 that is configured to execute a prioritized decoding process as described with reference to the embodiments in this application. Video encoder apparatus 600 may perform intra- and inter-coding of video blocks within video frames or parts thereof, e.g. video slices. Intra-coding relies on spatial prediction to reduce or remove spatial redundancy in video within a given picture. Inter-coding relies on temporal prediction to reduce or remove temporal redundancy in video within adjacent pictures or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

The video encoder apparatus may receive video data 602 to be encoded. In the example of FIG. 6, video encoder apparatus 600 may include partition unit 603, a mode select unit 604, summer 606, transform unit 608, quantization unit 610, entropy encoding unit 612, and decoded picture buffer 614. Mode select unit 604, in turn, may comprise a motion estimation unit 616, inter-prediction unit 620, and intra prediction unit 618. Inter-prediction unit may comprise a motion vector prediction unit 622, which may be configured to generate a list of motion vector predictor candidates according to the embodiments in this application. For video block reconstruction, the video encoder apparatus 600 may also include inverse quantization and transform unit 615, and summer 628. An in-loop filter, such as a deblocking filter 618, may also be included to filter-out artefacts from the reconstructed video frames. Additional loop filters (in-loop or post-loop) may also be used in addition to the deblocking filter. In case during the decoding of a coded picture into a decoded picture an in-loop filter is used to filter out artefacts, then metadata, e.g. a flag, may be inserted into the bitstream for signalling a decoder that it should use the in-loop filter during decoding. For example, in HEVC, the information whether the in-loop filter(s) are enabled may be inserted in the SPS or PPS messages, depending on whether the in-loop filtering is enabled or disabled on a per-picture or per-picture set basis.

The mode select unit 604 may select one of the coding modes (e.g. intra-prediction or inter-prediction modes based on error results of an optimization function such as a rate-distortion optimization (RDO) function), and provides the resulting intra- or inter-coded block to summer 606 to generate a block of residual video data (a residual block) to summer 628 to reconstruct the encoded block for use as a reference picture. During the encoding process, video encoder 600 may receive a picture and partition the picture into multiple video blocks. An inter-prediction unit 620 in the mode selection unit 604 may perform inter-prediction coding of the received video block relative to one or more blocks in one or more reference pictures to provide temporal compression. Alternatively, an intra-prediction unit 618 in the mode selection unit may perform intra-prediction coding of the received video block relative to one or more neighbouring blocks in the same picture or slice as the block to be coded to provide spatial compression. Video encoder may perform multiple coding passes, e.g., to select an appropriate coding mode for each block of video data.

The partition unit 603 may further partition video blocks into sub-blocks, based on evaluation of previous partitioning schemes in previous coding passes. For example, the partition unit may initially partition a picture or slice into LCUs, and partition each of the LCUs into sub-CUs based on rate-distortion analysis (e.g., rate-distortion optimization). The partitioning unit may further produce a quadtree data structure indicative of partitioning of an LCU into sub-CUs. Leaf-node CUs of the quadtree may include one or more PUs and one or more TUs.

The motion vector estimation unit 616 may execute a process of determining motion vectors for video blocks. A motion vector, for example, may indicate a displacement Dx,Dy of a prediction block (a prediction unit or PU) of a video block within a reference picture (or other coded unit) relative to the current block being coded within the current picture (or other coded unit). The motion estimation unit may compute a motion vector by comparing the position of the video block to the position of a prediction block of a reference picture that approximates the pixel values of the video block. Accordingly, in general, data for a motion vector may include a reference picture list (e.g. an (indexed) list of already decoded pictures (video frames) stored in the memory of the encoder apparatus), an index into the reference picture list, a horizontal (x) component and a vertical (y) component of the motion vector. The reference picture may be selected from one or more reference picture lists, e.g. a first reference picture list, a second reference picture list, or a combined reference picture list, each of which identify one or more reference pictures stored in reference picture memory 614.

The MV motion estimation unit 616 may generate and send a motion vector that identifies the prediction block of the reference picture to entropy encoding unit 612 and the inter-prediction unit 620. That is, motion estimation unit 616 may generate and send motion vector data that identifies a reference picture list containing the prediction block, an index into the reference picture list identifying the picture of the prediction block, and a horizontal and vertical component to locate the prediction block within the identified picture.

Instead of sending the actual motion vector, a motion vector prediction unit 622 may predict the motion vector to further reduce the amount of data needed to communicate the motion vector. In that case, rather than encoding and communicating the motion vector itself, the motion vector prediction unit 622 may generate a motion vector difference (MVD) relative to a known motion vector, a motion vector predictor MVP. The MVP may be used with the MVD to define the current motion vector. In general, to be a valid MVP, the motion vector being used for prediction points to the same reference picture as the motion vector currently being coded.

The motion vector prediction unit 622 may be configured to build a MVP candidate list that may include motion vectors associated with a plurality of already encoded blocks in spatial and/or temporal directions as candidates for a MVP. In an embodiment, the plurality of blocks may include blocks in the current video frame that are already decoded and/or blocks in one or more references frames, which are stored in the memory of the decoder apparatus. In an embodiment, the plurality of blocks may include neighbouring blocks, i.e. blocks neighbouring the current block in spatial and/or temporal directions, as candidates for a MVP. A neighbouring block may include a block directly neighbouring the current block or a block that is in the neighbourhood of the current block, e.g. within a few blocks distance.

When multiple MVP candidates are available (from multiple candidate blocks), MV prediction unit 622 may determine an MVP for a current block according to predetermined selection criteria. For example, MV prediction unit 622 may select the most accurate predictor from the candidate list based on analysis of encoding rate and distortion (e.g., using a rate-distortion cost analysis or other coding efficiency analysis). Other methods of selecting a motion vector predictor are also possible. Upon selecting an MVP, MV prediction unit may determine a MVP index, which may be used to inform a decoder apparatus where to locate the MVP in a reference picture list comprising MVP candidate blocks. MV prediction unit 622 may also determine the MVD between the current block and the selected MVP. The MVP index and MVD may be used to reconstruct the motion vector of a current block. Typically, the partition unit and mode selection unit (including the intra- and inter-prediction unit and the motion vector predictor unit) and the motion vector estimation unit may be highly integrated. These units are illustrated separately in the figures for conceptual purposes.

A residual video block may be formed by an adder 606 subtracting a predicted video block (as identified by a motion vector) received from mode select unit 604 from the original video block being coded. The transform processing unit 609 may be used to apply a transform, such as a discrete cosine transform (DCT) or a conceptually similar transform, to the residual video block to form a block of residual transform coefficient values. Transforms that are conceptually similar to DCT may include for example wavelet transforms, integer transforms, sub-band transforms, etc. The transform processing unit 609 applies the transform to the residual block, producing a transformed residual block. In an embodiment, the transformed residual block may comprise a block of residual transform coefficients. The transform may convert the residual information from a pixel value domain to a transform domain, such as a frequency domain. Transform processing unit 609 may send the resulting transform coefficients to a quantization unit 610, which quantizes the transform coefficients to further reduce bit rate.

A controller 617 may provide syntax elements (metadata) of the encoding process, such as inter-mode indicators, intra-mode indicators, partition information, and syntax information, to entropy coding and bitstream formatter unit 612. Here the syntax elements may include information for signalling (selected) motion vector predictors (for example an indication, e.g. an index in an indexed list, of the MVP candidate selected by the encoder), motion vector differences and metadata associated with the motion vector prediction process. The controller may control the encoding process based on an HRD model 611 which may define syntax elements, e.g. a flag that partial output is possible and/or picture timing SEI messages for timing of the partial output, that can be used for the generation of a formatted bitstream 613 that is suitable for partial output. For example, during the encoding process, the encoder may insert parameters and/or messages, such as SEI messages, into the bitstream that enable a decoder apparatus to partially output decoded DUs that are stored in the DPB. Examples of such messages are described with reference to the embodiments in this application.

The inverse quantization and inverse transform unit 615 may be configured to apply an inverse quantization and inverse transformation, respectively, to reconstruct the residual block in the pixel domain, e.g., for later use as a reference block. Inter-prediction unit 620 may calculate a reference block by adding the residual block to a prediction block of one of the reference pictures that are stored in the decoded picture buffer 614. Inter-prediction unit 620 may also apply one or more interpolation filters to the reconstructed residual block to calculate sub-integer pixel values for use in motion estimation. The reconstructed residual block may be added to the motion prediction block produced by the inter-prediction unit 620 to produce a reconstructed video block for storage in the reference picture memory 614. The reconstructed video block may be used by motion vector estimation unit 616 and inter-prediction unit 620 as a reference block to inter-coding a block in a subsequent picture.

The entropy coding unit 612 entropy may be configured to encode the quantized transform coefficients and the syntax elements into bitstream 628. For example, entropy coding unit may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighbouring blocks. Following the entropy coding by entropy coding unit, the encoded bitstream may be transmitted to another device (e.g., a video decoder) or stored for later transmission or retrieval.

A bitstream formatter 613 may be configured to format so that the bitstream comprises DUs and associated metadata for decoding the DUs according to a certain coding standard. The metadata may include parameters for signalling the decoder how the DUs can be decoded. This information may include prioritization information and parameters associated with the prioritization information and/or partial output of decoded DUs as described with reference to the embodiments in this application. In some embodiments, at least part of the prioritization information and/or information about the partial output may be determined by a video application and/or content creator. In that case, the encoder may receive this information and use it during the encoding processed to produce a formatted bitstream comprising DUs that are associated with prioritization information and/or that can be partially outputted during the decoding process. The metadata may be insert Hence, from the above it follows that the encoding process may include receiving a sequence of video frames comprising pixels; identifying coding dependencies between pixel regions of a current frame in the sequence of video frames and pixels regions of any preceding frame; encoding the video frame into a plurality of decoding units, DUs, and transforming the plurality of DUs in a bitstream with metadata, such as DU identification numbers and/or location information, indicating the DUs that comprise coded pixels of a pixel region in a picture as well as prioritization information indicating the decoding order of the DUs taking into the possible intra-coding dependencies of at least part of the DU of a picture, and, storing said bitstream containing the DUs and the metadata in an output buffer.

The encoder apparatus may perform a known rate-distortion optimisation (RDO) process in order to find the best coding parameters for coding blocks in a picture. Here, the best coding parameters (including mode decision (intra-prediction or inter-prediction); intra prediction mode estimation; motion estimation; and quantization) refer to the set of parameters that provide the best trade-off between a number of bits used for encoding a block versus the distortion that is introduced by using the number of bits for encoding.

The term rate-distortion optimization is sometimes also referred to as RD optimization or simply "RDO". RDO schemes that are suitable for AVC and HEVC type coding standards are known as such, see for example, Sze et al. "*High efficiency video coding (HEVC)*." Integrated Circuit and Systems, Algorithms and Architectures. Springer (2014): 1-375; Section: 9.2.7 RD Optimization. RDO can be implemented in many ways. In one well-known implementation, the RDO problem can be expressed as a minimization of a Lagrangian cost function J with respect to a Lagrangian multiplier:

$$\lambda :: \min_{(coding\ parameters)} J = (D + \lambda * R).$$

Here, the parameter R represents the rate (i.e. the number of bits required for coding) and the parameter D represents the distortion of the video signal that is associated with a certain rate R. The distortion D may be regarded a measure of the video quality. Known metrics for objectively determining the quality (objectively in the sense that the metric is content agnostic) include means-squared error (MSE), peak-signal-to-noise (PSNR) and sum of absolute differences (SAD).

In the context of HEVC, the rate-distortion cost may require that the encoder apparatus computes a predicted video block using each or at least part of the available prediction modes, i.e. one or more intra-prediction modes and/or one or more inter-prediction modes. The encoder apparatus may then determine a difference video signal between each of the predicted blocks and the current block (here the difference signal may include a residual video block) and transforms each residual video block of the determined residual video blocks from the spatial domain to the frequency domain into a transformed residual block. Next, the encoder apparatus may quantize each of the transformed residual blocks to generate corresponding encoded video blocks. The encoder apparatus may decode the encoded video blocks and compare each of the decoded video blocks with the current block to determine a distortion metric D. Moreover, the rate-distortion analysis may involve computing the rate R for each encoded video block associated with of one of the prediction modes, wherein the rate R includes a number of bits used to signal an encoded video block. The thus determined RD costs, the distortion D and the rate R of the encoded blocks for each of the prediction modes, are then used to select an encoded video block that provides the best trade-off between the number of bits used for encoding the block versus the distortion that is introduced by using the number of bits for encoding.

Instead of an encoder apparatus, the bitstream comprises DUs and associated metadata for decoding the DUs may also be created by modifying an existing encoded representation of a sequence of pictures. Such modification may be realized by an apparatus, a bitstream generating apparatus, which is configured to: receiving a bitstream comprising an encoded representation of a sequence of pictures; parsing the bitstream and identifying for each encoded representation of a picture in the sequence, a plurality of DUs representing a current picture, each of the plurality of DUs comprising an encoded set of pixels; injecting metadata in the bitstream to form a modified bitstream, the metadata including prioritization information associated with the plurality of DUs stored in the CPB, the prioritization information defining a decoding order in which the DUs of the current picture can be decoded, preferably taken into account the intra-coding dependencies of pixels of DUs of at least part of the plurality of DUs; and, outputting the modified bitstream.

Figure 7:
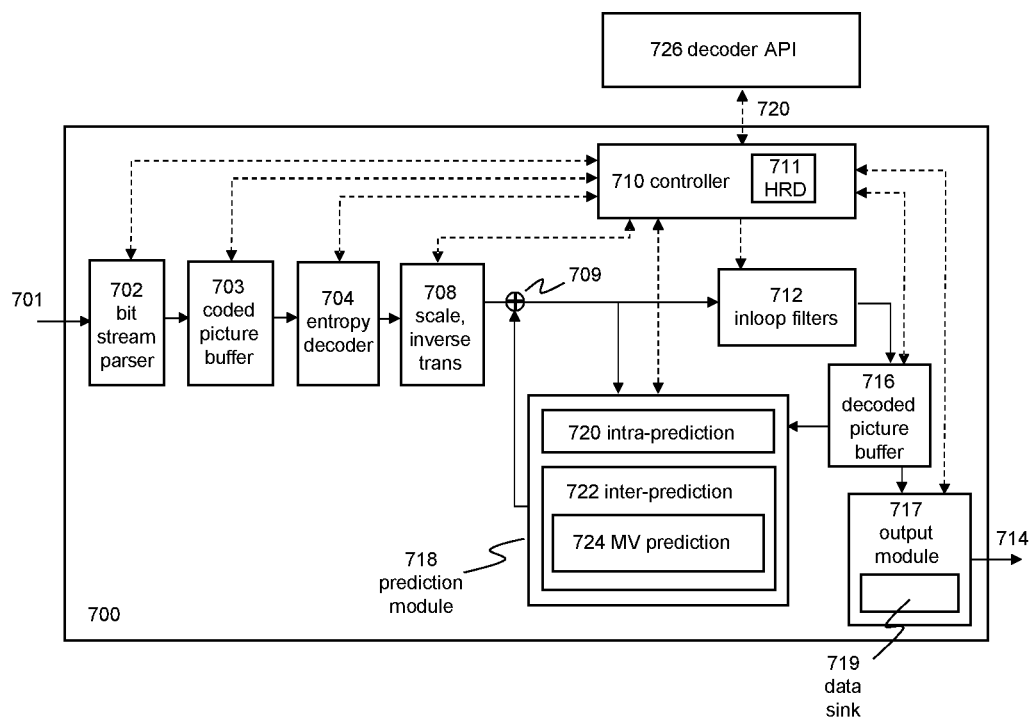
FIG. 7 depicts a decoder apparatus configured to perform partial output according to an embodiment of the invention.

FIG. 7 is a block diagram illustrating a video decoder apparatus 700 according to an embodiment of the invention. The decoder apparatus, or in short, decoder apparatus, may be configured to decode a bitstream comprising encoded video data as generated by a video encoder apparatus as described with reference to FIG. 6.

In the example of FIG. 7, video decoder apparatus 700 may include a bitstream parser 702, a coded picture buffer (CPB) 703, entropy decoding unit 704, prediction unit 718, inverse quantization and inverse transformation unit 708, summer 709, controller 710 and a decoded picture buffer (DPB) 716 for storing decoded information, including reference pictures that are used in the decoding process. Here, prediction unit 618 may include an inter-prediction unit 722 and intra-prediction unit 720. Further, the inter-prediction unit may include a motion vector prediction unit 724.

Similar to the motion vector predictor unit of the encoder apparatus of FIG. 6, the motion vector prediction unit of the decoder may be configured to build a MVP candidate list that may include motion vectors of a plurality of blocks, including blocks, such as neighbouring blocks, in the current video frame that are already decoded and/or blocks in one or more references frames, which are stored in the decoded picture buffer.

Decoder apparatus 700 may comprise an input 701 that is configured to receive a formatted bitstream 701 comprising encoded pictures, e.g. encoded video blocks and associated syntax elements from a video encoder. In an embodiment, the formatted bitstream may comprise so-called Network Abstraction Layer (NAL) units. A bitstream parser 702 (a filter) may extract the NAL units from the bitstream, unpacks the NAL units that comprise payload and associated metadata and use the metadata to store the payload and some of the metadata as DUs in the CPB. The metadata may include information related to the picture decoding order and the picture display order, such as the picture order count (POC). The picture decoding information may be used to store the DUs in decoding order in the CPB and to offer the DUs in decoding order to a decoding algorithm. The picture display order represents the order in which decoded pictures should be rendered. Typically, the decoding order differs from the POC order, therefore decoded pictures (or decoded DUs forming the decoded pictures) need to be temporality stored in the CPB before they are outputted.

Entropy decoding unit 704 decodes the bitstream to generate transformed decoded residual blocks (e.g. quantized coefficients associated with residual blocks), motion vector differences, and syntax elements (metadata) for enabling the video decoder to decode the bitstream. The motion vector differences and associated syntax elements are forwarded to prediction unit 718. The syntax elements may be received at video slice level and/or video block level. For example, by way of background, video decoder 700 may receive compressed video data that has been compressed for transmission via a network into so-called network abstraction layer (NAL) units. Each NAL unit may include a header that identifies a type of data stored to the NAL unit. There are two types of data that are commonly stored to NAL units. The first type of data stored to a NAL unit is video coding layer (VCL) data, which includes the compressed video data. The second type of data stored to a NAL unit is referred to as non-VCL data, which includes additional information such as parameter sets that define header data common to a large number of NAL units and supplemental enhancement information (SEI).

When video blocks of a video frame are intra-coded (I), intra-prediction unit 720 of prediction unit 718 may generate prediction data for a video block of the current video slice based on a signalled intra-prediction mode and data from previously decoded blocks of the current picture. When video blocks of a video frame are inter-coded (e.g. B or P), inter-prediction unit 722 of prediction unit 718 may produces prediction blocks for a video block of the current video slice based on motion vector differences and other syntax elements received from entropy decoding unit 704. The prediction blocks may be produced from one or more of the reference pictures within one or more of the reference picture lists stored in the memory of the video decoder. The video decoder may construct the reference picture lists, using default construction techniques based on reference pictures stored in reference picture memory 716.

Inter-prediction unit 720 may determine prediction information for a video block of the current video slice by parsing the motion vector differences and other syntax elements and using the prediction information to produce prediction blocks for the current video block being decoded. For example, inter-prediction unit 720 uses some of the received syntax elements to determine a prediction mode (e.g., intra- or inter-prediction) which was used to code the video blocks of the video slice, an inter-prediction slice type (e.g., B slice or a P slice), construction information for one or more of the reference picture lists for the slice, motion vector predictors for each inter-encoded video block of the slice, inter-prediction status for each inter-coded video block of the slice, and other information to decode the video blocks in the current video slice. In some examples, inter-prediction unit 720 may receive certain motion information from motion vector prediction unit 724.

The decoder apparatus may retrieve a motion vector difference MVD and an associated encoded block representing a current block that needs to be decoded. In order to determine a motion vector based on the MVD, the motion vector prediction unit 724 may determine a candidate list of motion vector predictor candidates associated with a current block. The motion vector predictor unit 724 may be configured to build a list of motion vector predictors in the same way as done by the motion vector predictor unit in the encoder.

The motion vector prediction algorithm may evaluate motion vector predictor candidates which are associated with blocks in the current frame or a reference frame that have a predetermined position (typically neighbouring) relative to the position of the current block. These relative positions are known to the encoder and the decoder apparatus. Thereafter, the motion vector prediction unit may select a motion vector predictor MVP from the list of motion vector prediction candidates based on the indication of the selected motion vector predictor candidate which was transmitted in the bitstream to decoder. Based on the MVP and the MVD the inter-prediction unit may determine a prediction block for the current block.

Inverse quantization and inverse transform unit 708 may inverse quantize, i.e., de-quantizes, the quantized transform coefficients provided in the bitstream and decoded by entropy decoding unit. The inverse quantization process may include the use of a quantization parameter calculated by video encoder for each video block in the video slice to determine a degree of quantization and, likewise, a degree of inverse quantization to be applied. It may further apply an inverse transform, e.g., an inverse DCT, an inverse integer transform, or a conceptually similar inverse transform process, to the transform coefficients in order to produce residual blocks in the pixel domain.

After the inter-prediction unit 720 has generated the prediction block for the current video block, the video decoder may form a decoded video block by summing a residual block with the corresponding prediction block. The adder 709 represents the component or components that perform this summation operation. If desired, a deblocking filter may also be applied to filter the decoded blocks to remove blocking artefacts. Other loop filters (either in the coding loop or after the coding loop) may also be used to smooth pixel transitions, or otherwise improve the video quality. The decoded video blocks in a given picture are then stored in a decoded picture buffer 716, which stores reference pictures which may be used for subsequent coding of further current blocks. The decoded picture buffer 616 may also store decoded video for later presentation on a display device.

In an embodiment, the decoder may comprise an output module 717, which is configured to control the partial output of one or more decoded DUs in the DPB. In another embodiment, at least part of the output module may be external to the decoder apparatus. For example, the output module may be implemented in or connected to the decoder API 726. Thus, if the decoder controller determines that if, during decoding of a plurality of DUs of a picture, a partial output can be performed, then the controller may copy the one or more decoded DUs from the DPB to a data sink 719 of the output module, while at least part of the plurality of DUs representing the picture, is not yet decoded and removed from the CPB. In that case, the one or more decoded DUs in the DPB may be marked as being available for partial output. In an embodiment, the marking may be used to label the one or more decoded DUs as not to be removed from the DPB before all DUs representing a picture are decoded and, optionally, before all DUs representing a picture are uses as a reference frame for the decoding process of one or more further DUs of further pictures.

The DUs are copied to the data sink without removing the one or more decoded DU from the DPB. The one or more decoded DUs that are copied to the data sink may represent part of the picture that is being decoded, which are accessible by a (software) application. Signaling may be used to inform an application that a partial output of the DPB has been performed and that the one or more decoded DUs of a picture that is still is not full decoded (i.e. one or more coded DUs are still in the CPB or in the process of being decoded by the decoder). Embodiments regarding the functioning of the DPB and the output module are described hereunder in more detail with reference to FIG. 8-15.

The controller may control the decoding process based on an HRD model 711 which may define syntax elements, e.g. a flag that partial output is possible and/or picture timing SEI messages for timing of the partial output, that can be used for processing coded DUs in the bitstream 702 according to the prioritized decoding process as described with reference to FIG. 5. For example, during the decoding process, the decoder may determine whether the bitstream is suitable for partial output as described with reference to the embodiments in this application. To that end, the decoder, or in particular the controller of the decoding process, may be configured to detect certain SEI messages in the bitstream which signal the decoder apparatus that partial output is possible. Alternatively, the decoder may be configured to determine if partial picture output is possible by examining certain parameters in the bitstream, for example, a parameter that signals whether in-loop filtering for pictures is disabled or enabled. For instance in HEVC, the deblocking filter can be turned on or off based on a flag (the pps_deblocking_filter_disabled_flag) in a PPS non-VCL NAL unit. Examples of such messages are described hereunder in more detail.

Hereunder, embodiments for enabling prioritized partial output of part of a picture are described hereunder in more detail. As described with reference to FIG. 5, the process may start with the allocation of memory for a decoded picture in a decoded picture buffer. Thus, in case a new coded picture needs to be decoded, space can be allocated in the DPB. This allocated memory space is configured to receive, and store decoded DUs, i.e. coded video data representing a set of pixels defining a particular area in a picture. The decoded DU eventually will be outputted, wherein the outputting may include copying the pixel values into a data sink, which may be associated with an application. The stored pixel values can also be used as a reference frame in a future decoding step.

Further, the process may include receiving a bitstream comprising a coded representation of a sequence of picture, parsing the bitstream and storing the coded pictures as DUs in a CPB. Once one or more DUs of a coded picture are stored in the CPB, the decoder may select a DU from the one or more DUs in the CPB based on the priority information and start the decoding process using the selected DU as input. As soon as the selected DU is provided to the decoding process, the DU is removed from the CPB and the set of pixels associated with the decoded DU is placed in the allocated memory of the DPB. The set of pixels (pixel values) are copied in the memory at the location corresponding to the location of set of pixels in the picture. This position in the decoded picture can be derived from the position of the DU in the coded picture as signalled in the bitstream, possibly using the position of slice or slice segment address in the coded picture.

The embodiments described below introduce metadata, e.g. signalling messages and HDR syntax elements, which enable prioritized decoding of DUs and partial output of decoded prioritized DUs as described above with reference to the modified HDR model of FIG. 4 and the prioritized decoding process of FIG. 5.

Depending on the application, the signalling of the partial output and the prioritization information may be based on metadata, e.g. SEI messages (or equivalent messages thereof), that are inserted in the bitstream (in-band) to the decoder. Alternatively, it is also possible to convey the metadata in an out-of-band channel to the decoder. The metadata may for example provided to the decoder via a decoder API.

A first set of metadata, e.g. syntax elements in messages such as SEI messages or headers such as the header of a NAL unit, may be used to control the decoding prioritization of DUs in the CPB. DUs may be prioritized (ordered) for decoding in different ways. In an embodiment, a DU property may be used which is configured to introduce a priority of the respective DU, with regards to the priority of the other DUs of the same AU.

Table 1 shows an example of a SEI message, in particular a DU SEI message syntax according to the HEVC draft standard. The message may be enhanced using a prioritization parameter. In an embodiment, such prioritization parameter may be referred to as a decoding_unit_priority parameter. Such parameter may be used as prioritization information signalling the decoder apparatus that a decoding priority value is assigned to a DU defined in the SEI message. The decoding_unit_priority parameter may have an (integer) value starting from zero and up, wherein for example the zero value may indicate the highest priority. An example of the use of such parameter is illustrate in FIG. 4C.

The advantage of managing prioritization at DU-level is that no global view of the priorities of the DUs within an AU is required to identify the decoding order of the available DUs. In other words, if a DU with priority 0 (the highest priority) is stored in the CPB, the decoder can be decoded it regardless whether it has knowledge of other DUs stored in the CPB. In an embodiment, the priority parameter may include values within a certain range wherein the lowest (or highest) value indicates the highest priority and the highest (or lowest) value indicates the lowest priority. For example, if there are two DUs (from the same AU) in the CPB, one with decoding_unit_priority=5 and the other with decoding_unit_priority=7, the decoder can start decoding the first one, regardless of whether there are others with lower priority that have not arrived yet. In a further embodiment, the decoding_unit_priority parameter may be used as a binary flag having a zero or one value. In that case, the bundle of "high priority" DUs can have it set to 0 and the rest to 1 (or viz versa).

The current HEVC draft standard includes a decoding_unit_idx parameter for identifying DUs of a picture (an AU). In an embodiment, the prioritization may be based on an ordered list of such DU identifiers. A disadvantage of using the idx parameter as prioritization parameter, is that each DU identifier idx is unique within the AU and thus cannot be used to group DUs with same priorities. Further, the decoding_unit_idx parameter was originally designed for identifying DUs that are required for decoding based on consecutive numbers so that if a DU with a high idx is in the buffer, will not be decoded if the previous have not already been decoded. Table 1 depicts a SEI message including prioritization information for prioritizing DUs of a picture (an AU):

TABLE 1

DU info SEI message syntax

| | Descriptor |
|---|---|
| decoding_unit_info( payloadSize ) { | |
|   decoding_unit_idx | ue(v) |
|   decoding_unit_priority | ue(v) |
|   if( !decoding_unit_cpb_params_in_pic_timing_sei_flag ) | |
|     du_spt_cpb_removal_delay_increment | u(v) |
|   dpb_output_du_delay_present_flag | u(1) |
|   if( dpb_output_du_delay_present_flag ) | |
|     pic_spt_dpb_output_du_delay | u(v) |
| } | |

As shown in this table, the SEI message includes a decoding_unit_priority parameter for signaling the decoding priority of an DU stored in the CPB.

In another embodiment, the decoding prioritization of DUs of a picture in the CPB may be realized on AU level. For this approach, an ordered list may be determined that comprises the identities, for example the DU identities as defined by the decoding_unit_idx parameter, for all the DUs in the AU in order of priority (higher to lower or vice versa).

To transmit this list in the bitstream, a SEI message or another suitable data container may be used. An extract of a Picture Timing SEI message comprising DU decoding prioritization information is shown in Table 2 below. As shown in this table, the list may be introduced by a cpb_decoding_unit_priority list syntax element which may have a size of num_decoding_units_minus1 plus 1 (i.e. number of DUs in the AU).

TABLE 2

Picture Timing SEI message syntax extract

| | Descriptor |
|---|---|
| pic_timing( payloadSize ) { | |
|   cpb_removal_delay_minus1[ bp_max_sub_layers_minus1 ] | u(v) |
|   ... | |
|   ... | |
|   dpb_output_delay | u(v) |
|   if( bp_decoding_unit_hrd_params_present_flag ) { | |
|     pic_dpb_output_du_delay | u(v) |
|     for( i = 0; i <= num_decoding_units_minus1; i++ ) { | |
|       cpb_decoding_unit_priority[i] | u(v) |
|     } | |
|   } | |
|   if( bp_decoding_unit_hrd_params_present_flag && decoding_unit_cpb_params_in_pic_timing_sei_flag ) { | |
|     num_decoding_units_minus1 | ue(v) |
|   ... | |
|   ... | |
| } | |

Selecting a DU to decode in a content-specific case using the aforementioned properties may be achieved based on the per-DU signaling approach by going through the DUs in the CPB and decoding the high priority first, followed by the rest, for as long as the decoding time that is available for decoding the DUs of a picture allows so. An algorithm implementing such approach is provided by following pseudocode block:

```
While (DUs_in_CPB > 0 && current_decoder_clock – pic_spt_dpb_output_du_delay
< 0){
    select_current_DU
    select_next_DU
    if (current_DU.decoding_unit_priority < next_DU.decoding_unit_priority){
        DU_to_decode = current_DU
    }
    if(!next_DU){
    SelectedDU
    removeDUFromCPB
    resetSelectedDUs
    }
}
```

Here, the CPB output delay parameters, pic_spt_dpb_output_du_delay may specify how many sub-clock ticks to wait after removal of the last DU in an AU from the CPB, before the decoded picture is output from the DPB, e.g. by copying its content into a data sink of an API or an application. Thus, DUs are selected for decoding based on the DU priority parameter as long as there are DUs in the CPB and the CPB output delay parameter signals that decoding is possible, Once all DUs are decoded or if the time for decoding the AU has ended, the DUs of the AU are removed from the CPB.

In another embodiment, priority-based decoding of DUs may be based on AU-level (picture level) signaling. In this embodiment, a DU priority list may be used to decode DUs already in the buffer with the highest priority, and repeat until the list is empty, or until there is no time available for decoding the AU based on the pic_spt_dpb_output_du_delay syntax element. An algorithm implementing such approach is provided by following pseudocode block:

```
While (
        DUs_in_CPB > 0 && (current_decoder_clock -
pic_spt_dpb_output_du_delay) < 0){
    for(i = 0; I < num_decoding_units_minus1; i++){
        selected_DU = findDUinCPB(cpb_decoding_unit_priority[i])
        if (selected_DU){
            removeDUFromCPB
        }
    }
}
```

Prioritization of DUs for decoding in the user-specific case may be realized in different ways. In an embodiment, an application may insert or modify metadata, such prioritization information, in the bitstream prior to feeding the bitstream to the decoder apparatus. For example, such application may be configured to change the decoding_unit_priority syntax element and/or the cpb_decoding_unit_priority list syntax element as described above).

In another embodiment, a decoder apparatus may be associated with or comprise an API that allows an application to insert or modify prioritization information in the bitstream prior to storing the encoded representation of a sequence of pictures as DUs in the CPB or insert or modify prioritization information in the DUs that are stored in the CPB. For example, the decoder may be associated with (or comprise) a function, such as a SetDecodingUnitPriority function, that is configured to receive a priority-ordered list containing DU identifiers, such as decoding unit idx parameters, of DUs of a picture and to use this information to prioritize DUs for decoding that are stored in the CPB. For example, in an embodiment, a video application may be configured to determine which DU or DUs of a current picture should be decoded first.

For example, in case of 360 video or 3D point cloud rendering, the application may give DUs associated with an area of pixels in a picture that coincide or at least partly coincide with the current viewport the highest decoding priority. Such DUs may be referred to viewport DUs. Further, it may assign a lower decoding priority to DUs associated with pixels that border the area of pixels that define the viewport DUs, followed by default/recommended DUs, i.e. areas of pixels in a picture selected by a content creator, and then remaining DUs.

A second set of metadata, e.g. syntax elements in messages such as SEI messages and/or metadata in headers of data structures, such as a header of a NAL unit, may be used to control the partial output process of decoded DUs at the DPB. For example, metadata may include information for informing the decoder apparatus that partial output is desired. Further, metadata may include decoding information, such as timing information, for controlling the partial output process. Timing information relevant for the modified HDR model may include for example timing information for removal of DUs from the CPB and timing information for copying a set of pixels of a decoded DU from the DPB into a data sink. Such timing information can be used to determine a time interval in which decoded DUs of a picture in the DPB can be accessed by an application via a data sink.

In some embodiments, the decoder apparatus maybe configured to determine if, during decoding of the coded picture, at least one partial output can be performed. For example, if in-loop filtering is activated for DUs in a picture, neighbouring DUs of a picture are required before filtering can take place. In that case, in principle partial output would not be possible as soon as the DU is decoded unless the filtering process is deactivated across the boundary of the decoded DUs in the decoded picture. If the filtering across boundaries of decoded DUs is not disabled, partial output is still possible if all the pixels from decoded DUs have been processed by the filtering which is a point in time earlier than all the pixels of the picture are available. In particular partial output is possible when the filtering process has been applied after the required neighbouring decoded DUs were made available in the DPB.

Thus, to determine if partial picture output is possible, the decoder needs to know if in-loop filtering is active for a particular picture or for a set of pictures, e.g. a set of pictures in a GOP structure. In an embodiment, the decoder may examine whether the in-loop filtering is enabled or not. For example, in HEVC, the information of whether the in-loop filter(s) are activated can be contained in SPS or PPS NAL units, depending on whether the in-loop is enabled/disabled on a per-picture or per-picture set basis respectively. Based on this information the decoder apparatus is able to determine if partial picture output is applicable. If in-loop filters are enabled, and slices are present, individual information about the respective filter per slice is contained in the Slice Segment Header. In other standards, the information on the filters may be carried in other data containers such as the open bitstream units (OBUs) in AV1.

Alternatively, in an embodiment, the bitstream may include an indication, e.g. a flag, that explicitly signals the decoder apparatus that partial picture output can be used. Such signalling may be useful for a client application for initializing the video decoding processing pipeline and setting the required buffers etc. This signalling can be implemented using SEI messages, which are non-VCL units. Alternatively, in an embodiment, the signalling may be implemented in the SPS or the PPS of the VCL-NAL units, comprising the coded DUs of a picture (depending on whether partial picture output is available for a single or multiple pictures). In a further embodiment, the signalling may be based on an external channel, e.g. an application that is connected via a decoder interface, an API, to the decoder apparatus.

In an embodiment, in case explicit signalling that partial picture output can be used, the decoder apparatus may assume that the in-loop filtering is disabled, disabled across the boundary of the decoded DUs in the decoded picture or that samples from a decoded DUs have been processed by the filtering.

In case it is signalled (either implicit or explicit) that partial output is possible the bitstream may include further signalling messages. For example, in an embodiment, a SEI message (a type of NAL units), such as so-called picture timing SEI messages, may be used for providing timing information of DUs to a decoder. Other SEI messages, such as a decoding unit information SEI message, may be used to convey relevant decoding information to the decoder. Further relevant SEI messages include buffering period SEI messages for example, that comprise buffering parameters like the cpb_delay_offset syntax element. More generally, depending on the implementation, signalling messages for controlling prioritized partial decoding according to the embodiments in this application may be implemented based on data formats and syntax elements of known current and future coding standards, e.g. HEVC, AV1, VP9, VVC. etc.

Once a coded picture is removed from the CPB, the associated decoded picture in the DPB may become available for output after a predetermined time delay, which may be signaled to the decoder apparatus as a time delay parameter. In an embodiment, in HEVC and VVC, the time delay may be provided based on the picture dpb output time delay parameter. Such this delay parameter or in case of other standards a delay parameter similar to this delay parameter may be determined for each picture. Its value may dependent on different decoder parameters of the HDR model, including (at east) the two following time instances:
1. a CPB removal time, i.e. the time instance at which a coded picture is removed from the CPB (because it is fully decoded into a decoded picture and stored in the DPB)
2. a DPB output time, a time instance at which a decoded picture (as stored in the DPB) is output.

In VVC and HEVC, the dpb output time delay of a picture is governed by the pic_dpb_output_delay syntax element. After this delay, a decoded picture that is stored in the DPB is outputted. Typically, after output, the picture is removed from the DPB, unless it is kept for future use (e.g. for reference used in the decoding process of other frames).

In the modified HDR model, a timing parameter associated with the partial output is defined. In particular, the model includes a delay parameter, which signals the decoder apparatus that after a particular time period a partial picture output can be performed. The parameter may be referred to as a dpb partial output time delay parameter. Depending on the picture dpb output delay parameter, during the decoding of a complete picture, partial output of decoded DUs of the picture may be performed one or several times. This way, during the decoding process, decoded information in the DPB becomes available for output before the picture dpb output delay has ended.

Hence, the modified HDR model no longer assumes that the decoding process is instantaneously, but requires a certain amount of time. During this decoding time, decoded information in the DPB may be made available for output so that it can already be used by an application. In practice this means that at one or more time instances (defined for example by the dpb partial output time delay parameter), the decoded information in the DPB that is processed up to the moment of each of these time instances may be copied to a data sink so that it can be accessed by an application, before the end of the picture dpb output delay. Thus, during decoding of a coded picture, one or more (multiple) transfers of decoded sets of pixels (of decoded DUs) from the DPB to a data sink may take place before the end of the picture dpb output delay. Preferably, DUs available in the CPB are decoded in a prioritized order defined by the prioritization information and sets of pixels of the decoded DUs become available for partial output in the DPB in the prioritized order.

Here, a data sink is a general term for any storage or buffering means that is capable of receiving data from the decoder. Examples of a data sink include an external buffer, e.g. a rendering buffer of an VR application, a socket, a memory, a hard disc, etc. Note that it in a conventional standardized decoder is not possible for an application to access decoded information in the DPB (which is part of the decoder). It is assumed that the output process of the HRD model is governed by copying (blocks of) decoded information from the DPB to a data sink outside the decoder.

The granularity at which decoded information in the data sink becomes available by the partial picture output scheme may depend on the type of application. The smallest unit that can be made available is a DU, i.e. a basic processing unit at which a decoder process takes place, e.g., output of one or more macro-blocks in AVC or one or more coding tree units (CTUs) in HEVC or VVC. Alternatively, sub-picture output of the DPB can be realized at higher level picture partitioning schemes, such a decoding unit (DU) or a sub-picture as specifically defined in HEVC and VVC respectively.

Table 3 depicts part of a Picture Timing SEI message according to an embodiment of the invention. In this particular embodiment, sub-picture output is organized at picture-level.

TABLE 3

Picture Timing SEI message syntax extract

| | Descriptor |
|---|---|
| pic_timing( payloadSize ) { | |
| ... | |
|   au_cpb_removal_delay_minus1 | u(v) |
|   pic_dpb_output_delay | u(v) |
|   if ( pic_partial_output_interval_present_flag ) { | |
|     pic_dpb_partial_output_interval | u(v) |
|   } | |
|   if( sub_pic_hrd_params_present_flag ) { | |
|     pic_dpb_output_du_delay | u(v) |
|   } | |
|   if( bp_decoding_unit_hrd_params_present_flag && decoding_unit_cpb_params_in_pic_timing_sei_flag ) { | |
|     num_decoding_units_minus1 | ue(v) |
| ... | |
| ... | |
| } | |

As shown in Table 3, the message comprises an au cpb removal time delay and a pic dpb output delay which may be used by the decoder to compute a time at which a decoded picture in the DPB is outputted. The table further includes a sub-picture output flag, which is referred to as the pic_partial_output_interval_present_flag. This binary flag may be used to signal whether the sub-picture output functionality is available. This functionality is also referred to as the partial output functionality.

If the flag is true, an output interval for the sub-picture output may be defined. The output interval parameter may be defined by the pic_dpb_partial_output_interval syntax element which may be set to a particular value. This parameter defines an output interval for the sub-picture output of the DPB. The interval may be defined in clock ticks. Further, the interval may be selected to be substantially smaller than the picture dpb output delay. This way, the sub-picture output scheme allows multiple sub-picture outputs of the DPB during decoding of a single picture, i.e. multiple outputs of the DPB within the period defined by the picture dpb output delay syntax element. In this embodiment, the partial picture output of the DPB may have a picture size format, i.e. at the end of each pic_dpb_partial_output_interval a copy of the whole content of the DPB is transferred to the data sink.

Table 4 depicts part of a Picture Timing SEI message according to another embodiment of the invention. In this embodiment, sub-picture output is organized at DU-level.

TABLE 4

Picture Timing SEI message

| | Descriptor |
|---|---|
| pic_timing( payloadSize ) { | |
| ... | |
|    au_cpb_removal_delay_minus1 | u(v) |
|    pic_dpb_output_delay | u(v) |
|    if( sub_pic_hrd_params_present_flag ) { | |
|       pic_dpb_output_du_delay | u(v) |
|       pic_dpb_partial_output_interval | u(v) |
|    } | |
|    if( bp_decoding_unit_hrd_params_present_flag && | |
| decoding_unit_cpb_params_in_pic_timing_sei_flag ) { | |
|       num_decoding_units_minus1 | ue(v) |
| ... | |
| ... | |
| } | |

As shown in table 4, the message comprises an au cpb removal delay and a pic dpb output delay which are used by the decoder to determine when a decoded picture at sub-picture level as known from HEVC and VVC respectively. Table 4 further includes a sub_pic_hrd_params_present_flag flag. If this flag is true, the processing of the picture takes place at sub-picture level as defined e.g. in HEVC and VVC, wherein the pic_dpb_output_du_delay value is set. This delay value may be used by the decoder to compute the picture dpb output delay, i.e. the time after removal of the last decoding unit in an access unit from the CPB before the decoded picture is output from the DPB. The message further includes a pic_dpb_partial_output_interval syntax element for signalling the decoder the interval that is used for the sub-picture output of the DPB. The interval may be defined in clock ticks and allows multiple sub-picture outputs during the decoding of the picture in a similar way as described with reference to table 1 above. In this embodiment, the partial picture output of the DPB may have a picture-size format, i.e. at every partial picture output, a copy of the whole DPB is transferred to the output sink.

Table 5 depicts part of a Picture Timing SEI message according to yet another embodiment of the invention. In this embodiment, sub-picture output may be organized at DU-level.

TABLE 5

Picture Timing SEI message

| | Descriptor |
|---|---|
| pic_timing ( payloadSize ) { | |
| ... | |
|    au_cpb_removal_delay_minus1 | u(v) |
|    pic_dpb_output_delay | u(v) |
|    if( sub_pic_hrd_params_present_flag ) { | |
|       pic_dpb_output_du_delay | u(v) |
|       pic_dpb_partial_output_du_interval | u(v) |
|    } | |
|    if( bp_decoding_unit_hrd_params_present_flag && | |
| decoding_unit_cpb_params_in_pic_timing_sei_flag ) { | |
|       num_decoding_units_minus1 | ue(v) |
| ... | |
| ... | |
| } | |

In this embodiment, sub-picture output (partial output) may be organized at decoding unit (DU) or sub-picture level. This mode may set based on a flag, for example if sub_pic_hrd_params_present_flag is equal to 1. Further, the message may include the same syntax elements to signal that sub-picture DPB is available, however in this case instead of a pic_dpb_partial_output_interval syntax element, a pic_dpb_partial_output_du_interval syntax elements may be used so signal the interval that is used for the sub-picture output of the DPB. In this embodiment, the sub-picture output of the DPB may have a size that matches the size of a DU or a sub-picture, i.e. at every sub-picture output a copy of a sub-picture in the DPB is transferred to the output sink. Thus, in this embodiment, the size of the data sink can be of DU or sub-picture size.

The next step of the partial picture output scheme may include marking a decoded DUs in the DPB as being ready for partial output. This marking may be a label or a flag that signals the decoder apparatus not to remove the one or more decoded DUs from the DPB. With regards to marking the picture for reference and for removal, these types of marking concern markings of the whole picture and thus does not interfere with the marking of a DU for partial picture output.

The next step of the partial picture scheme may include copying the one or more marked decoded DUs from the DPB to the data sink without removing the one or more decoded DU from the DPB. Further, an application associated with the data sink may be signalled that a partial output of the DPB has been performed.

In a first embodiment, the partial picture output buffer may have the same size or at least the size as the size of coded picture. Thus, in case of a partial picture output, decoded DUs in the DPB are copied to the data sink and the decoder may mark the decoded DUs to be available for partial output, but not to be removed from the DPB yet. The timing of the partial output can be either 'as-soon-as-possible' or determined by HRD parameters that may specify a time for each of these partial outputs. In low-delay applications, the application may want to have access to the data as soon as possible, without any further delay. In that case, a flag may be used to indicate that a partial picture output is available in the data sink so that the renderer or other post-processing device may make a decision to either process (e.g. show) the same frame twice or to process (e.g. show) the partially new frame.

In an embodiment, an application may be informed about the decoding status of a picture by the decoder. Hence, in that case, the decoder apparatus may be configured to generate output information associated with a picture that is processed by the decoder apparatus. For example, in an embodiment, the output information may identify which areas of a picture that is processed by the decoder are already decoded and/or which areas of the picture are not yet decoded. In an embodiment, such area in the picture may define a group of pixels of one or more decoded DUs. Further, the output information may include the number of DUs that are decoded and/or that are not yet encoded. This way, the application is informed which decoded pixel values are made available in a data sink by the decoder. Table 6 below shows an example of the syntax of a decoding status message.

TABLE 6 syntax of a decoding status message

| | Descriptor |
|---|---|
| completion_status_of_decoded_picture( ){ | |
|    incomplete_flag | u(1) |
|    if( incomplete_flag ){ | |

TABLE 6-continued syntax of a decoding status message

| | Descriptor |
|---|---|
| num_incomplete_areas | ue(v) |
| for( incomplete_area=0; area<  num_incomplete_areas; incomplete_area ++){ | |
| origin_width | u(v) |
| origin_height | u(v) |
| width | u(v) |
| height | u(v) |
| } | |
| } | |
| } | |

As shown in this table, the message includes different syntax elements for monitoring the decoding status of a picture. The message may include a flag, incomplete flag, for signalling if the picture is fully decoded or not. The message will be updated during decoding until each area is filled in with DU pixels. This message or at least the information in the message may be signalled to an application at every partial output. In an embodiment, the message may be generated by the decoder apparatus or a decoder API associated with the decoder apparatus and sent to the application. The meaning of the syntax elements may be as follows:

| | |
|---|---|
| incomplete_flag | whether the full picture is decoded or not. If the flag is 0 then the image is complete, if the flag is 1 then there are still regions to be filled in. |
| num_incomplete_areas | number of areas that need to be described as incomplete |
| origin_width | origin of an incomplete area in the x axis |
| origin_height | origin of an incomplete area in the y axis |
| width | width of the area to be described |
| height | height of the area to be described |

Thus, the number of areas in the picture that do not yet comprise decoded samples (representing DUs that still need to be decoded) may be signalled as well as the dimension of each area and the position of each area of the picture that is not yet decoded and/or that is decoded.

Figure 8A:
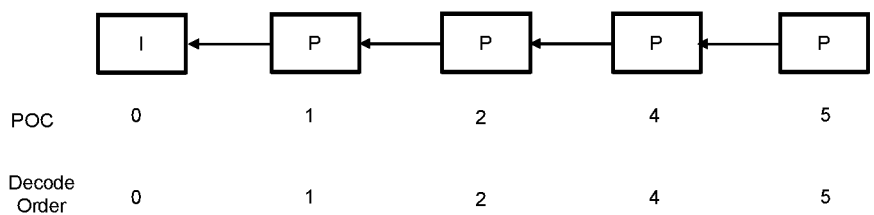
FIGS. 8A and 8B depict schematics of picture sequence structures.

The partial output schemes described in the embodiments can be used with different picture sequence structures, e.g. group of picture GOP structures or coded video sequence CVS structures. FIG. 8A shows an example of a picture sequence structure, including an intra-coded, I, picture followed by a number of predictive (P) pictures, wherein each P picture references back to an earlier P picture or the I picture. The pictures in the picture sequence structure are ordered in decoding order, i.e. the order in which the pictures are encoded in the bitstream as received by the decoder apparatus. Further, the pictures of the picture sequence structure are associated with an output order parameter, such as the picture order count (POC) parameter. This output order parameter may define a unique ordered number, which signals the sequence in which decoded pictures are to be rendered (displayed). As shown in the figure, in this picture sequence structure the order in which the pictures are decoded is the same as the output order in which the picture is rendered. Thus, as soon as the picture (an AU) is decoded, it can be outputted and rendered. Hence, this picture sequence structure may be used in low-latency applications.

Figure 8B:
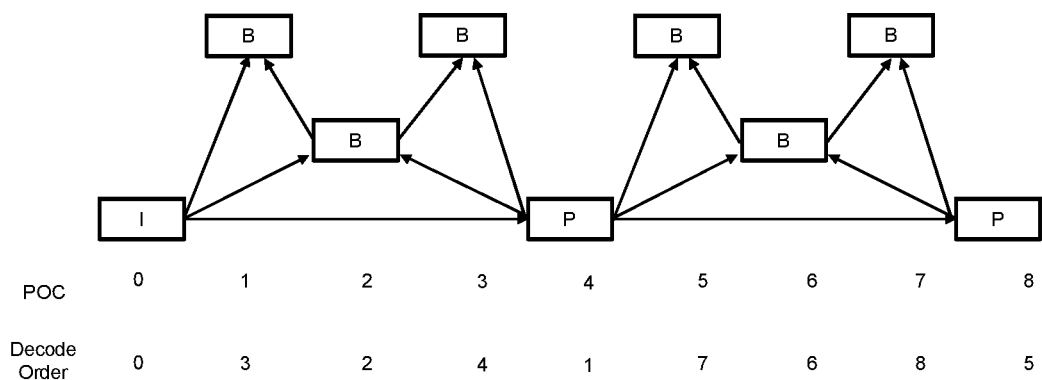

FIG. 8B shows another picture sequence structure including I, P and so-called bi-predictive B frames, the latter being dependent on both previously decoded pictures and pictures that are to be decoded later. As shown in this figure, the decoding order does not match the output order as defined by the output order parameter, such as the POCs. For example, in this example the I picture may decoded and can be rendered according to the POC. Thereafter, according to the decoding order, a P frame is decoded based on the I frame and a first B frame is decoded based on the I and the P frame. Only then, the second B frame, which is to be rendered after the I frame, can be decoded based on the I frame and the first B frame. Hence, before the second B frame can be decoded and rendered, two other frames need to be decoded and stored as reference frames in the decoded picture buffer (DPB).

A decoder apparatus may receive information on the decoding order and picture order in the form of metadata. Typically, a picture sequence structure is transmitted (and arrives) as a whole, e.g. in one data container, with the coded pictures in the bitstream reordered to match the decoding order. During decoding, pictures are output (rendered) in a sequence that is defined by the POC. In low-latency scenarios frames may be transmitted as soon as they are output from the encoder. For such situations, the decoding (and the outputting) of the pictures, and decoded DUs associated with such pictures, may be made available to an application as soon as possible. For a low latency GOP structure of FIG. 8A the decoding order is identical to the output (rendering) order so that after decoding and partial output of decoded DUs, an application can access and render decoded DUs in the data sink.

Also, in case the decoding order is not the rendering order, access to decoded DUs of a coded pictures that is being decoded by the decoder may be useful. For example, an application may start performing a post-processing step, e.g. filtering, on the decoded DUs, while the decoder is still in the process of decoding DUs of the coded picture. In that case, decoded DUs can be output (i.e. they are copied in a data sink that is accessible to an application), but they are also kept in the DPB to be used for reference in decoding other pictures. Moreover, the decoder may determine output information that includes the location of the coded picture to which the decoded DUs belong.

Typically, state of the art video processing systems may include an application between the output of the decoder and a rendering engine (in contrast to legacy systems like TV sets that render directly after decoding). In such video processing systems, even if a picture (or a DU of a picture) is output (from the decoder), it does not have to be necessary rendered directly, but might require further processing, for example cropping or filtering. Hence, out-of-POC order pictures (or DUs) may allow post-decoding processing to start as soon as the picture (or the DU) is decoded, regardless of its POC. This output scheme, which may be referred to as the out of POC order output scheme, may be realized in different ways.

In an embodiment, part of the functionality may be implemented in the decoder API so that it capable of receiving decoded pictures and associated DUs in an order that is different from the POC order. In another embodiment, the functionality may be signalled in the bitstream, e.g. in a suitable message, such as a SEI message.

In these embodiments, during an initialization phase of the decoder, the decoder may be instructed to put the decoder in a so-called direct output mode. In this mode, the decoder may override signalling/marking parameters that control the time and/or conditions when a picture or a DU is outputted, i.e. copied from the DPB to a data sink. Such parameters may include HDR delay parameters and/or POC values. The instructions may cause the decoder not to use the signalling for output. However, the decoder may not necessarily ignore the signalling/marking for other functions.

In the direct output mode, the decoder may be configured to treat every incoming picture or DU for direct (immediate output), i.e. as if there were no dependencies from future frames for decoding. For example, a picture or a DU may be decoded, stored in the CPB in accordance with the requirements for reference pictures and outputted by copying the picture or DU in that data sink. To enable the direct output mode, the decoder needs to be aware of or determine the POC value of each picture. In an embodiment, this may be achieved by explicitly signaling POC values. In another embodiment, the application may be aware of the GOP structure e.g. via out-of-band signalling, bitstream analysis, metadata in the bitstream, etc.

In an embodiment, information about the decoding status of a picture, e.g. a decoded picture update message as described with reference to table 5, may include information about the POC, which is used as an identifier for identifying decoded pictures in the DPB [the POC also functions as an identifier for identifying decoded pictures in the DPB; do we need to identify the areas using an explicit identifier?]. Table 7 below shows an example of the syntax of a decoding status message that is similar to the one of table 6 but now includes information about the POC, e.g. a poc_present_flag and a poc value. Thus, if the flag is set, the status message may include a POC value of the picture to which the decoded DU belongs to.

TABLE 7 syntax of a decoding status message

| | Descriptor |
|---|---|
| completion_status_of_decoded_picture( ){ | |
|   incomplete_flag | u(1) |
|   poc_present_flag | u(1) |
|   poc | u(v) |
|   if( incomplete_flag ){ | |
|     num_incomplete_areas | ue(v) |
|     for( incomplete_area=0; area< | |
|     num_incomplete_areas; incomplete_area | |
| ++){ | |
|       origin_width | u(v) |
|       origin_height | u(v) |
|       width | u(v) |
|       height | u(v) |
|     } | |
|   } | |
| } | |

Figure 9:
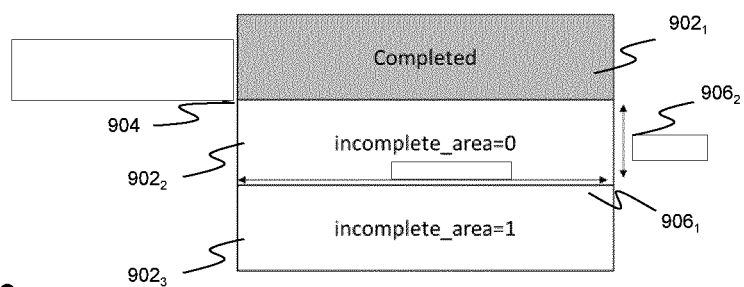
FIG. 9 depicts a buffer output scheme according to an embodiment of the invention.

FIG. 9 depicts an example of decoded picture buffer DPB buffering decoded DUs of a picture. The decoded picture buffer may be configured as an addressable memory for storing pixel values. The memory cells may represent a 2D grid wherein each cell may be assigned to a position in the 2D grid and may be configured to store a pixel value. The memory may be arranged to allocate memory space of multiple pictures, e.g. reference pictures and one or more pictures that are currently being decoded.

As shown in the figure, the DPB may comprise a plurality of buffer areas $902_{1-3}$. Each buffer area may comprise a set of memory cells having an associated position in the 2D grid (in short areas) that are formatted for receiving pixels of decoded DUs. In this particular non-limiting example, the buffer may comprise three areas of a predetermined size. Each buffer area may have a size that corresponds to the size of a DU. In this example, three decoded DUs stored in each of the buffer areas may form. The dimensions of each buffer area may be defined based on the above-mentioned syntax elements related to e.g. dimensions $906_{1,2}$ (height, width), and an origin 904 (origin_width, origin_height). The figured illustrates a DPB wherein the (top) first area pixels of a decoded DU are stored. This decoded DU may comprise pixels of a first (top) part of the picture while the other buffer areas pixels of the two other areas are not yet decoded. Each time a DU is decoded, stored in the allocated memory of the DPB and marked for partial output, the decoding status message of the picture may be updated and signalled to the application. Once the decoding of the picture is finalized, the incomplete flag may signal that the decoding process of the picture is finished. In that case, process of decoding the next picture may be started.

The decoded picture buffer may store all decoded pictures that are decoded and used in the decoding process. The stored pictures are used for two processes:
1. pictures are stored in the DPB for output to the data sink so that these pictures can be processed by a rendering process.
2. pictures are stored in the DPB to serve as reference pictures for pictures that still need to be decoded.

Figure 10:
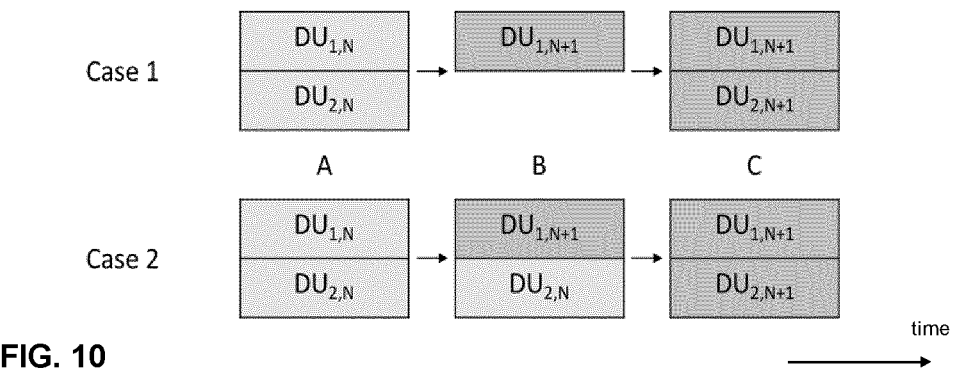
FIG. 10 depicts a buffer output scheme according to another embodiment of the invention.

FIG. 10 illustrates the progression of filling a DPB with decoded DUs of a plurality (in this example two) different video frames N and N+1 for two different embodiments (referred to in the picture as case 1 and case 2). The letters A, B and C represent different steps in time of filling a buffer during a partial output process as described with reference to the embodiments of this application. The first embodiment (case 1), illustrates a process wherein after decoding the DUs of video frame N (step A), the buffer is flushed and the first $DU_{1,N+1}$ of a subsequent video frame N+1 is decoded and stored in the DPB (step B). Only at step C, the second $DU_{2,N+1}$ of the subsequent video frame N+1 is decoded and stored in the DPB forming a full picture. Hence, in that case, the content of the buffer at step B cannot be used as a reference and thus will be discarded.

In contrast, in the second embodiment (case 2), decoded DUs of video frame (step A) are used as a base for the next step in the decoding process. Thus, when in step B, the first DU of video frame N+1, $DU_{1,N+1}$, is decoded, it is copied into the allocated memory of the DPB, overwriting pixel values that belong to the first DU of video frame N, $DU_{1,N}$. In that case, the content of the buffer at step B is still useful as a reference for future frames. The examples of FIG. 10 provide two different types of an output buffer architecture that is described with reference to FIG. 11.

Figure 11A:
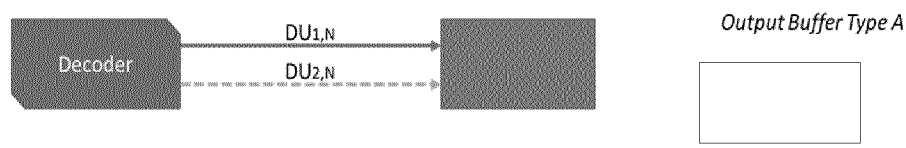
FIG. 11A-11C depicts buffer output schemes according to various embodiments of the invention.
Figure 11B:
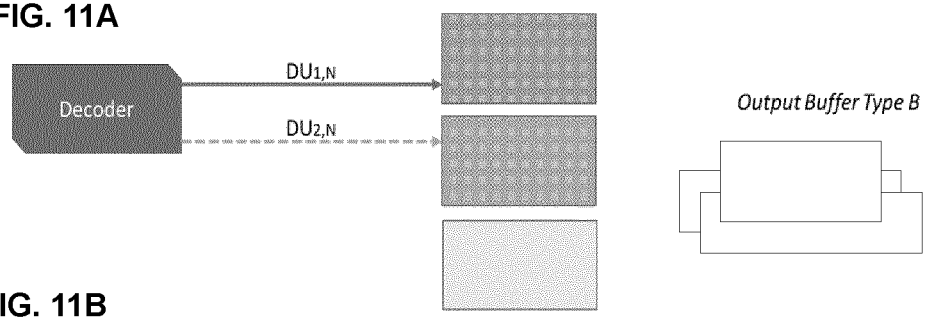
Figure 11C:
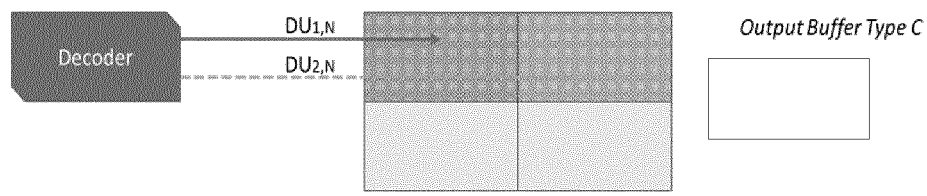

FIG. 11A-11C depict different architectures of data sinks that can be used with the embodiments according to the invention. The data sinks include a first data sink (type A) which includes (at least) one buffer that has a size that matches the size of at least a DU, a second data sink (type B) comprising a plurality of buffers, wherein each buffer has a size that matches the size of at least a DU and a third data sink (type C) that has a buffer that has a size that matches the size of at least one picture. In that case, the buffer may include a plurality of buffer areas, wherein each buffer area may have a size of at least one DU.

FIG. 11A depicts an exemplary embodiment of a single DU-sized data sink or output sink. Such architecture may be used if all DUs have the same size and allows one data sink (e.g. file pointer, computer socket, memory pointer, etc.) of relatively small size. As every new DU that is outputted will overwrite the DU that is stored in the data sink, close monitoring by the application and synchronization with the decoder regarding the outputting of a decoded DU from the CPB into the data sink are required. This approach may be used for systems where memory is a main constraint, but there is enough processing power and timing fidelity to utilize the DUs as the arrive, before they are flushed to be replaced from the next one.

FIG. 11B depicts an exemplary embodiment of a data sink comprising a plurality of DU-sized data sinks. In an embodiment, the data sink may include N DU-sized data sinks wherein N is an integer number larger than one. In that situation, the size of each DU is the same. In another embodiment, the data sink may include N data sinks of different sizes. Such architecture may be used if DUs are of different sizes and assumes that the number of DUs is constant for the whole sequence, or at least the number of DUs can be inferred from the bitstream by the decoder for a certain part of a bitstream sequence. This architecture may allow for more flexibility when compared to the data sink of FIG. 11A in the sense that at a given time more than one DU of a picture is available for processing, e.g. partial output. Such approach is suitable when batch processing of DUs may be used or if the processing power is not constant. Also in this case the application needs to monitor and synchronize with the decoder regarding the outputting of a decoded DU from the CPB into the data sink.

FIG. 11C depicts an exemplary embodiment of a picture-sized data sink. In an embodiment, this architecture may be used in case a picture includes a combination with HEVC tiles or VVC sub-pictures for which the DUs belong to the same picture but can be decoded independently from one another. The decoding status message as described above with reference to table 4 may be used to monitor and signal the filling of the data sink with decoded DUs.

For each of these data sink architectures, an application using the output of the decoder may be informed about an update of a data sink by polling the sink in regular intervals to identify if there was an update (i.e. a new DU was decoded). Alternatively, or in addition, in an embodiment, a call-back event may be generated by e.g. a decoder API every time the sink is updated. In yet a further embodiment, a hybrid approach may also be used wherein a first update mechanism (as e.g. the main update mechanism) is polling the sinks regularly (e.g. periodically or according to a predetermined timing scheme) and using a call-back event which is only fired or triggered for specific events (e.g. initializing the sink, switch decoding from the DUs of one AU to DUs of another AU without the first one being completely decoded yet etc.). The application may use the call-back information to adjust the polling frequency and/or timing.

Figure 12:
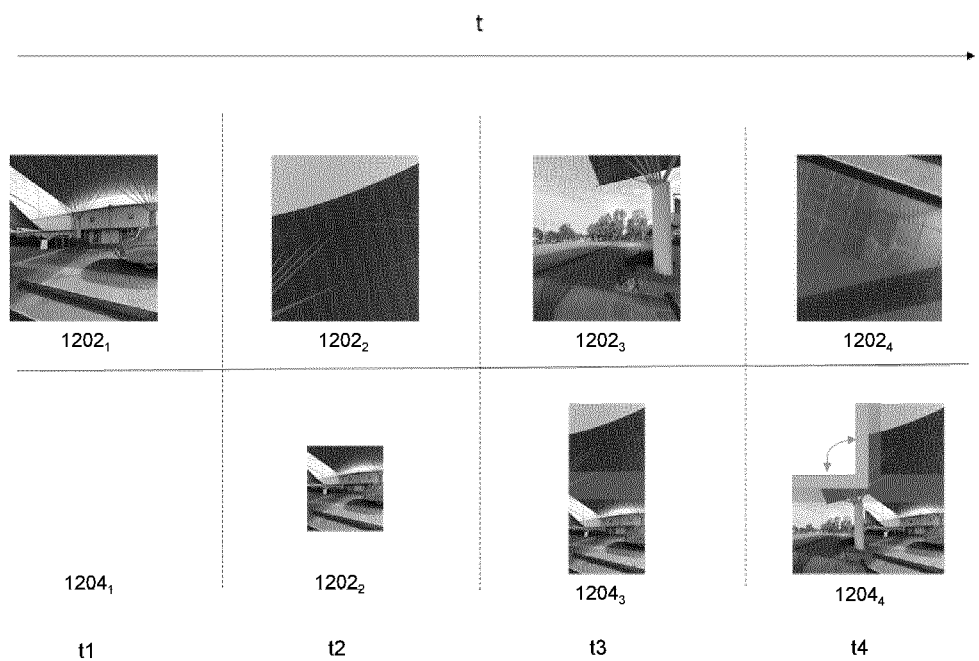
FIG. 12 schematically depicts processing prioritized decoded DUs according to an embodiment of the invention.

FIG. 12 schematically depicts processing prioritized decoded DUs according to an embodiment of the invention. As shown in this figure pictures $1202_{-4}$ may represent sets of pixels of decoded DUs of a picture that are sequentially outputted at different time instances based on the prioritized decoding and output process as described with reference to the embodiments in this application. Each time instance t1-t4 a further set of pixels of a picture becomes available for post-processing, e.g. stitching and filtering, as depicted by pictures $12042_{1-4}$.

Figure 13:
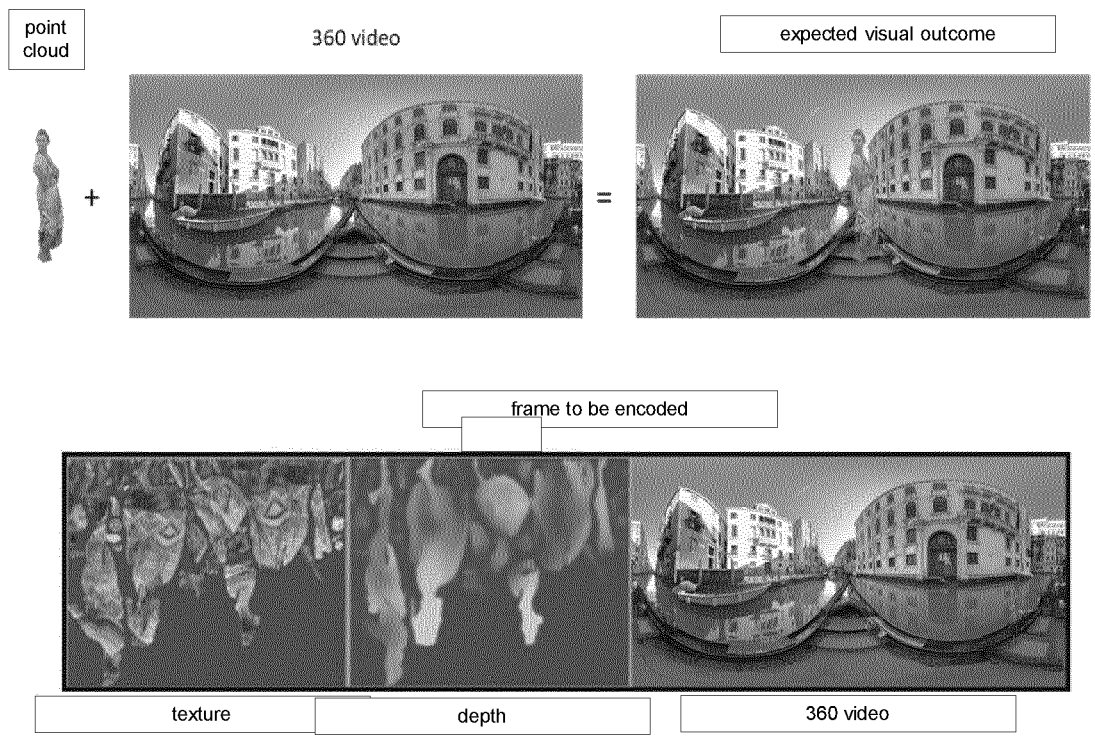
FIG. 13 depicts an example of a video frame comprising multiple media types.

FIG. 13 depicts an example of a video frame comprising multiple media types, e.g. a point cloud representation and 360 video as a background, that can be advantageously processed using the embodiments described in this disclosure. The multiple media components may be placed in the same frame to time-lock them. The first media component may be coded into one or more DUs associated with a first media type and the second media component may be coded into one or more DUs associated with a second media type. If the DUs of the first media type of a coded picture, e.g. a point cloud representation, are decoded, they can be outputted to a data sink for further processing, while the DUs of the second media type of the coded picture, e.g. projected 360 video data representing the background, are being decoded. Based on MPEG's V3C standard, which leverages existing video standards, both a point cloud and a video picture can be coded in the same frame. This way, the point cloud may be transformed to pixels representing 'texture' and pixels representing depth information.

Figure 14:
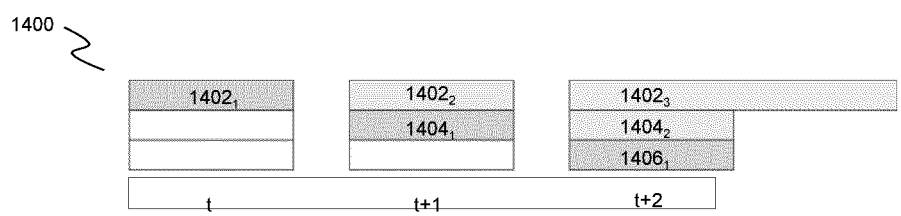
FIG. 14 depicts an exemplary use of the prioritized decoding process according to an embodiment of the invention.

FIG. 14 depicts an exemplary use of the prioritized decoding process according to an embodiment of the invention. In this example, post-processing of part of the partially outputted decoded data can already start while the decoding of the full picture is not finished yet. The figure schematically depicts a picture 1400 comprising of three DUs. At time t, the decoding of the first DU $1402_1$ may be finished so that a partial output can be performed by copying the decoded DU in the data sink. An application may use the data to perform an operation such as upscaling. Meanwhile, the decoder may continue decoding and finish decoding of a second DU $1404_1$ at t+1, while the application is upscaling the first DU $1402_2$. In t+2 the first upscaled DU $1402_3$ is finalized (to twice its original size), the second DU $1404_2$ may be upscaled by the application, while the third DU $1406_1$ is decoded.

One advantage of this packing into the same frames is that the different objects are time locked (synchronised) by design of video elementary streams, i.e., by belonging to a single frame corresponding to a certain decoding timestamp, hence referring to a single point in time of the media timeline. But when these different video objects are packed together in the same picture, they become available to the application all at the same time as a single output picture after decoding. That is, the application has no fine access to each of these objects but can only access them when all the objects for a certain picture are decoded.

This can be problematic in a scenario where a decoder apparatus cannot decode the full picture in time, but is only capable of decoding part of the frame. Such situation could may for example when the processor, e.g. the CPU or GPU, of the decoder apparatus overheats and performance decreases, when—due to network issues—a part of a picture has not arrived in time, when a CPB error occurs in feeding the decoder with DUs, when an error in the transmission of bitstream or manipulation of the bitstream makes one or multiple DUs undecodable and/or when an error occurs in the decoding process itself.

Figure 15:
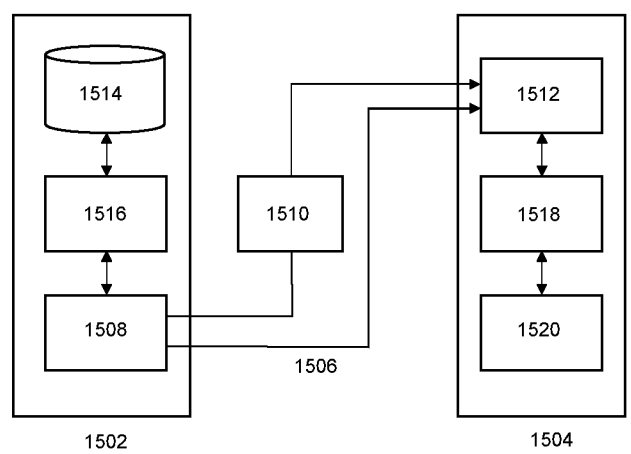
FIG. 15 depicts a block diagram illustrating an exemplary data processing system that may be used with embodiments described in this disclosure.

FIG. 15 depicts a schematic of a video encoding and decoding system 1500 that may use the techniques described in this application. As shown in FIG. 15, system 1500 may include a first video processing device 1502, e.g. a video capturing device or the like, configured to generate encoded video data which may be decoded by a second video processing device 1504, e.g. a video playout device. First and second video processing devices may include any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the video processing devices may be equipped for wireless communication.

The second video processing device may receive the encoded video data to be decoded through a transmission channel 1506 or any type of medium or device capable of moving the encoded video data from the first video processing device to the second video processing device. In one example, the transmission channel may include a communication medium to enable the first video processing device to transmit encoded video data directly to the second video processing device in real-time. The encoded video data may be transmitted based on a communication standard, such as a wireless communication protocol, to the second video processing device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, servers or any other equipment that may be useful to facilitate communication between first and second video processing devices.

Alternatively, encoded data may be sent via an I/O interface 1508 of the first video processing device to a storage device 1510. Encoded data may be accessed by input an I/O interface 1512 of the second video processing device. Storage device 1510 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may hold the encoded video generated by the first video processing device. The second video processing device may access stored video data from storage device via streaming or downloading. The file server may be any type of server capable of storing encoded video data and transmitting that encoded video data to the second video processing device. Example file servers include a web server (e.g., for a website), an FTP server, network attached storage (NAS) devices, or a local disk drive. The second video processing device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 36 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 1500 may be configured to support one-way or two-way video transmission to support applications such as video streaming, video playback, video broadcasting, and/or video telephony.

In the example of FIG. 15, the first video processing device may further include a video source 1514 and a video encoder 1516. In some cases, I/O interface 1508 may include a modulator/demodulator (modem) and/or a transmitter. The video source may include any type of source such as a video capture device, e.g., a video camera, a video archive containing previously captured video, a video feed interface to receive video from a video content provider, and/or a computer graphics system for generating computer graphics data as the source video, or a combination of such sources. If video source 1514 is a video camera, the first and second video processing device may form so-called camera phones or video phones. However, the techniques described in this disclosure may be applicable to video coding in general, and may be applied to wireless and/or wired applications.

The captured, pre-captured, or computer-generated video may be encoded by video encoder 1516. The encoded video data may be transmitted directly to the second video processing device via I/O interface 1508. The encoded video data may also (or alternatively) be stored onto storage device 1510 for later access by the second video processing device or other devices, for decoding and/or playback.

The second video processing device may further comprise a video decoder 1518, and a display device 1520. In some cases, I/O interface 1512 may include a receiver and/or a modem. I/O interface 1212 of the second video processing device may receive the encoded video data. The encoded video data communicated over the communication channel, or provided on storage device 1510, may include a variety of syntax elements generated by video encoder 1516 for use by a video decoder, such as video decoder 1518, in decoding the video data. Such syntax elements may be included with the encoded video data transmitted on a communication medium, stored on a storage medium, or stored a file server.

Display device 1520 may be integrated with, or external to, the second video processing device. In some examples, second video processing device may include an integrated display device and also be configured to interface with an external display device. In other examples, second video processing device may be a display device. In general, display device displays the decoded video data to a user, and may comprise any of a variety of display devices such as a liquid crystal display (LCD), a plasma display, an organic light emitting diode (OLED) display, or another type of display device.

Video encoder 1516 and video decoder 1518 may operate according to a video compression standard, such as the High Efficiency Video Coding (HEVC), VP9, AV1, EVC or VVC. Alternatively, video encoder 1516 and video decoder 1518 may operate according to other proprietary or industry standards, such as the ITU-T H.264 standard, alternatively referred to as MPEG-4 Part 10: Advanced Video Coding (AVC), or extensions of such standards. The techniques of this disclosure, however, are not limited to any particular coding standard.

Although not shown in FIG. 15, in some aspects, video encoder 1516 and video decoder 1518 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 1516 and video decoder 1518 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 1516 and video decoder 1518 may be included in one or more encoders or decoders, either of which may be integrated as part of a combined encoder/decoder (CODEC) in a respective device.

This disclosure may generally refer to video encoder "signaling" certain information to another device, such as video decoder. The term "signaling" may generally refer to the communication of syntax elements and/or other data (metadata) used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of processing an encoded representation of a sequence of pictures, the method including:

allocating, by a processor of a decoding apparatus, memory for a current picture of the sequence of pictures in a decoded picture buffer, DPB;

receiving, by the processor, a bitstream comprising an encoded representation of the current picture, and storing the encoded representation as a plurality of decoding units, DUs, in a coded picture buffer, CPB, each of the plurality of DUs comprising an encoded set of pixels, wherein at least two DUs have no intra-coding dependency on pixels of the other DUs of the plurality of DUs;

receiving, by the processor, prioritization information associated with the plurality of DUs stored in the CPB, the prioritization information defining a decoding order in which the DUs of the current picture can be decoded, preferably taken into account the intra-coding dependencies of pixels of DUs of at least part of the plurality of DUs;

decoding, by the processor, one or more said plurality of DU's into one or more decoded DU's, in accordance with said decoding order, each decoded DU comprising a set of pixels, each set of pixels being associated with a different area in the current picture;

storing, by the processor, the sets of pixels in the DPB, a set of pixels being stored at a location in the allocated memory of the DPB that corresponds to a position of the area in the current picture; and, outputting by the processor, as a partial output, one or more sets of pixels of decoded DUs of the current picture in accordance with the decoding order, while other DUs of the current picture are being decoded or received by the decoding apparatus.

2. The method according to claim 1, wherein the processor outputting the one or more sets of pixels of the decoded DUs further comprises:

determining output information, the output information identifying for at least one of the one or more sets of pixels a position of an area in the current picture; and, providing access to the output information for an application outside the decoding apparatus, preferably via an application programming interface, API.

3. The method according to claim 1, wherein the processor outputting the one or more sets of pixels of decoded DUs further comprises:

copying each of the sets of pixels in at least one data sink, which is accessible by an application outside the decoding apparatus, preferably via an API.

4. The method according to claim 1 wherein the prioritization information comprises for each DU of the current picture a DU identifier, for example a decoding_unit_idx identifier, a priority parameter for the decoder apparatus to determine the decoding order, and/or, DU position identifiers for identifying the position in the current picture of a set of pixels associated with a DU, preferably the DU identifier and the priority parameter being associated with a DU being formatted as a Network Abstraction Layer, NAL, unit or the like, more preferably the NAL unit comprising or being implemented as a Supplemental Enhancement Information, SEI, message such as a DU info SEI message.

5. The method according to claim 1 wherein the prioritization information comprises a DU priority list for the current picture, the DU priority list comprising DU identifiers, for example decoding_unit_idx identifiers, the order of identified DUs in the DU priority list being used by the decoder apparatus to determine the decoding order, preferably a position of a DU identifier in the DU priority list identifying a decoding priority of a DU relative to a decoding priority of other DUs of the current picture, more preferably the DU priority list associated with the current picture being formatted as a NAL unit or the like, preferably the NAL unit comprising or being implemented as a supplemental enhancement information, SEI, message such a such as a Picture Timing SEI message.

6. The method according to claim 2 wherein the output information further comprises at least one of:
information indicating whether the encoded representation of the current picture is fully decoded or not;
information indicative of the number DUs that are not yet decoded and/or the number of DUs that are decoded; or, information for determining the number of DUs that are not yet decoded and/or the number of DUs that are decoded;
one or more areas in the current picture that are not yet decoded and/or one or more areas in the current picture that are decoded;
an output order identifier, preferably a picture order count POC value, associated with the current picture, the output order identifier identifying the output position of the current picture in the sequence of pictures relative to the output position of the other pictures in the sequence.

7. The method according to claim 1 wherein one or more DUs of the plurality of DUs comprise an encoded representation of at least one of: 360 video data, omnidirectional video data, depth information of a scene, video data associated with a predetermined viewing angle or point cloud data.

8. The method according to claim 1, wherein the decoding order is arranged for outputting pixel sets of decoded DUs associated with a viewport of a video rendering device, preferably a Virtual Reality, VR, rendering device, the outputting being prior to outputting pixel sets not associated with the viewport, wherein the viewport encompasses only a part of the current picture.

9. The method according to claim 1
wherein the data sink includes at least one buffer that at least matches the size of a decoded DU, the performing of the partial output including: copying pixels of the decoded DU in the DPB to the at least one buffer; or,
wherein the data sink comprises at least n buffers, preferably n being equal to the number of the plurality of DUs, the size of each of the n buffers at least matching the size of a decoded DU, the performing of the partial output including copying pixels of the decoded DU in at least one of the n buffers.

10. The method according to claim 1
wherein the data sink has at least one buffer that at least matches the size of at least one picture, the performing of the partial output including:
copying pixels of a decoded DU into the buffer at a position according to the position of the pixels of the decoded DU in the current picture.

11. The method according to claim 1
wherein a DU is based on one or more macroblocks as defined in AVC, one or more coded tree units CTUs as defined in HEVC, one or more slices as defined in HEVC or VVC or one or more sub-pictures as defined in VVC; and/or,
wherein the decoding is based on a coding standard, preferably a block-based video coding standard, more preferably an AVC, HEVC, VP9, AV1, VVC, EVC coding standard or a coding standard based on of the AVC, HEVC, VP9, AV1, VVC, EVC coding standard.

12. A decoding apparatus for processing an encoded representation of a sequence of pictures, the decoding apparatus comprising:
a non-transitory computer-readable storage medium having computer readable program code embodied therewith, and a processor coupled to the non-transitory computer-readable storage medium, wherein responsive to executing the computer readable program code, the processor is configured to perform executable operations comprising:
allocating memory for a current picture of the sequence of pictures in a decoded picture buffer, DPB;
receiving a bitstream comprising an encoded representation of the current picture, and storing the encoded representation as a plurality of decoding units DUs, in a coded picture buffer, CPB, each of the plurality of DUs comprising an encoded set of pixels, wherein at least two DUs have no intra-coding dependency on pixels of the other DUs of the plurality of DUs;
receiving prioritization information associated with each of the plurality of DUs stored in the CPB, the prioritization information defining a decoding order in which the DUs of the current picture are being decoded, preferably taken into account the intra-coding dependencies of pixels of DUs of at least part of the plurality of DUs;
decoding one or more of said plurality of DU's into one or more decoded DU's, in accordance with said decoding order, each decoded DU comprising a set of pixels, each set of pixels being associated with a different area in the current picture;
storing the sets of pixels in the DPB, a set of pixels being stored at a location in the allocated memory of the DPB that corresponds to a position of the area in the current picture; and,
outputting as a partial output, one or more sets of pixels of decoded DUs of the current picture in accordance with the decoding order, while other DUs of the current picture are being decoded or received by the decoding apparatus.

13. The decoding apparatus according to claim 12, wherein the executable operations further comprise:
copying each of the sets of pixels in at least one data sink, which is accessible by an application outside the decoding apparatus, preferably via an API.
determining output information, the output information identifying for at least one of the one or more sets of pixels a position of an area in the current picture; and,
providing access to the output information for an application outside the decoding apparatus, preferably via an application programming interface.

14. An encoder apparatus for determining an encoded representation of a sequence of pictures, the encoder apparatus comprising:
a non-transitory computer-readable storage medium having computer readable program code embodied therewith, and a processor, preferably a microprocessor, coupled to the computer readable storage medium, wherein responsive to executing the computer readable program code, the processor is configured to perform executable operations comprising:
receiving a sequence of pictures comprising pixels;
identifying coding dependencies between pixel regions of a current picture in the sequence of pictures and pixels regions of other pictures in the sequence of pictures;
encoding the current picture into a plurality of decoding units, DUs, each of the plurality of DUs comprising an encoded set of pixels;
transforming the plurality of DUs in a bitstream comprising metadata for decoding the DUs, the metadata including prioritization information associated with the plurality of DUs stored in the CPB, the prioritization information defining a decoding order in which the DUs of the current picture can be decoded, preferably taken into account the intra-coding dependencies of pixels of DUs of at least part of the plurality of DUs, and storing said bitstream containing the DUs and the metadata in an output buffer.

15. A bitstream generating apparatus comprising:

a non-transitory computer-readable storage medium having computer readable program code embodied therewith, and a processor coupled to the non-transitory computer-readable storage medium, wherein responsive to executing the computer readable program code, the processor is configured to perform executable operations comprising:

receiving a bitstream comprising an encoded representation of a sequence of pictures;

parsing the bitstream and identifying for each encoded representation of a picture in the sequence, a plurality of DUs representing a current picture, each of the plurality of DUs comprising an encoded set of pixels;

injecting metadata in the bitstream to form a modified bitstream, the metadata including prioritization information associated with the plurality of DUs stored in the CPB, the prioritization information defining a decoding order in which the DUs of the current picture can be decoded, preferably taken into account the intra-coding dependencies of pixels of DUs of at least part of the plurality of DUs; and, outputting the modified bitstream.

16. A non-transitory computer-readable storage medium having instructions stored thereon, the instructions, when run on a computer system, being configured for performing the method according to claim 1.

* * * * *